US012761481B2

(12) United States Patent
Kuzuhara et al.

(10) Patent No.: US 12,761,481 B2
(45) Date of Patent: Oct. 13, 2026

(54) OPTICAL SYSTEM AND IMAGE DISPLAY DEVICE

(71) Applicant: Panasonic Intellectual Property Management Co., Ltd., Osaka (JP)

(72) Inventors: Satoshi Kuzuhara, Osaka (JP); Kazuhiro Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 349 days.

(21) Appl. No.: 18/532,148

(22) Filed: Dec. 7, 2023

(65) Prior Publication Data

US 2024/0111161 A1 Apr. 4, 2024

Related U.S. Application Data

(63) Continuation of application No. PCT/JP2022/017533, filed on Apr. 11, 2022.

(30) Foreign Application Priority Data

Jun. 9, 2021 (JP) ................................ 2021-096823

(51) Int. Cl.
*G02B 27/01* (2006.01)
*G02B 6/34* (2006.01)

(52) U.S. Cl.
CPC ........... *G02B 27/0172* (2013.01); *G02B 6/34* (2013.01)

(58) Field of Classification Search
CPC ........................................................ G02B 6/34
See application file for complete search history.

(56) References Cited

U.S. PATENT DOCUMENTS 10,429,645 B2 10/2019 Vallius
2011/0187964 A1 8/2011 Li et al.
(Continued)

FOREIGN PATENT DOCUMENTS

EP 3 175 280 4/2018
JP 2015-49376 3/2015
(Continued)

OTHER PUBLICATIONS

Extended European Search Report issued Aug. 9, 2024 in corresponding European Patent Application No. 22819943.6.
(Continued)

*Primary Examiner* — Sung H Pak
(74) *Attorney, Agent, or Firm* — Wenderoth, Lind & Ponack, L.L.P.

(57) ABSTRACT

An optical system includes a light guide for guiding an image light ray output from a display element to a field of view region as a virtual image. The light guide includes a periodic structure defined in a body having a plate shape. The periodic structure has periodicity in three predetermined directions intersecting each other within a predetermined plane perpendicular to a thickness direction of the body. The periodic structure includes an in-coupling region configured to divide the image light ray into a plurality of image light rays and allow the plurality of image light rays to propagate within the body in a plurality of branch directions parallel to the three predetermined directions, respectively, and an exit region configured to allow the plurality of image light rays propagating in the plurality of branch directions within the body to emerge from the body toward the field of view region.

15 Claims, 12 Drawing Sheets

(56) References Cited

U.S. PATENT DOCUMENTS

| | | | | |
|---|---|---|---|---|
| 2017/0102543 | A1 | 4/2017 | Vallius | |
| 2020/0110261 | A1 | 4/2020 | Grey et al. | |
| 2020/0209630 | A1 | 7/2020 | Schultz et al. | |
| 2021/0157148 | A1 | 5/2021 | Lou et al. | |
| 2024/0094456 | A1* | 3/2024 | Schultz | G02B 5/1819 |

FOREIGN PATENT DOCUMENTS

| | | |
|---|---|---|
| JP | 2020-515884 | 5/2020 |
| JP | 2021-33252 | 3/2021 |
| WO | 2018/178626 | 10/2018 |
| WO | 2020/135634 | 7/2020 |
| WO | 2020/212647 | 10/2020 |

OTHER PUBLICATIONS

Extended European Search Report issued Aug. 9, 2024 in European Patent Application No. 22819944.4.

Bernard C. Kress et al., "Waveguide combiners for mixed reality headsets: a nanophotonics design perspective", Nanophotonics, vol. 10, No. 1, pp. 41-74; Oct. 7, 2020.

Choon How Gan et al., "Effects of polarization and spatial coherence in the pupil expansion with crossed gratings in an AR display", Digital Optics for Immersive Displays II, Proc. of SPIE 2020, vol. 11350, pp. 1135002-1-1135002-8; Mar. 30, 2020.

International Search Report issued Jun. 28, 2022 in International Application No. PCT/JP2022/017533.

International Search Report issued Jun. 28, 2022 in International Application No. PCT/JP2022/017535.

English Translation of the International Preliminary Report on Patentability issued in International Application No. PCT/JP2022/017535 on Dec. 21, 2023.

English Translation of the International Preliminary Report on Patentability issued in International Application No. PCT/JP2022/017533 on Dec. 21, 2023.

Notice of Allowance issued Mar. 26, 2026 in U.S. Appl. No. 18/531,891.

Office Action issued Jan. 6, 2026 in related U.S. Appl. No. 18/531,891.

Communication pursuant to Article 94(3) EPC issued Feb. 23, 2026 in European Patent Application No. 22 819 944.4.

Communication pursuant to Article 94(3) EPC issued Feb. 23, 2026 in European Patent Application No. 22 819 943.6.

* cited by examiner

4B

4C

OPTICAL SYSTEM AND IMAGE DISPLAY DEVICE

CROSS-REFERENCE TO RELATED APPLICATIONS

The present application is a continuation of PCT/JP2022/017533 filed on Apr. 11, 2022, which claims priority to Japanese Patent Application No. 2021-096823 filed on Jun. 9, 2021, the entire contents of which are incorporated herein by reference.

TECHNICAL FIELD

The present disclosure relates to optical systems and image display devices.

BACKGROUND ART

U.S. Pat. No. 10,429,645 discloses an optical element (optical system) including a waveguide (light guide) for expanding an exit pupil in two directions. The optical element includes three diffractive optical elements (DOEs). The first DOE is configured to couple a beam from an imager into the waveguide. The second DOE expands the exit pupil in a first direction along a first coordinate axis. The third DOE expands the exit pupil in a second direction along a second coordinate axis and couples light out of the waveguide.

US 2020/0209630 discloses a waveguide including a surface provided with an in-coupling diffractive optic and an out-coupling diffractive optic. The out-coupling diffractive optic includes a diffractive array having rows with different grating vectors which are arranged alternately and therefore has multiple grating vectors which are not parallel to the grating vector of the in-coupling diffractive optic.

SUMMARY OF INVENTION

Technical Problem

The techniques disclosed in U.S. Pat. No. 10,429,645 and US 2020/0209630 are used for head mounted displays, for example. Regarding the head mounted displays, depending on how to use the optical element, there may be a demand for downsizing the waveguide of the optical element.

The present disclosure provides an optical system and an image display device capable of downsizing a light guide.

Solution to Problem

An optical system according to one aspect of the present disclosure includes: a light guide for guiding an image light ray which is output from a display element and forms an image, to a field of view region of a user as a virtual image, the light guide including a body having a plate shape and a periodic structure formed in the body, the periodic structure having periodicity in three predetermined directions intersecting each other within a predetermined plane perpendicular to a thickness direction of the body, and the periodic structure including an in-coupling region dividing the image light ray incident from the display element into a plurality of the image light rays and allowing the plurality of image light rays to propagate within the body in a plurality of branch directions including first, second, and third branch directions respectively parallel to the three predetermined directions.

An image display device according to one aspect of the present disclosure includes the above optical system and the display element.

Advantageous Effects of Invention

Aspects of the present disclosure enables downsizing a light guide.

DESCRIPTION OF EMBODIMENTS

Hereinafter, embodiments will be described in detail with reference to appropriate drawings. Note that, description more detailed than necessary will be omitted. For example, detailed description of well-known matters or duplicate description of substantially the same components may be omitted. This aims to avoid the following description from becoming more redundant than necessary and to facilitate understanding of persons skilled in the art. The inventor(s) provides the following description and attached drawings for making persons skilled in the art understand the present disclosure only and has no intention to limit the subject matter recited in the claims.

1. Embodiments

1.1 Outline

Figure 1:
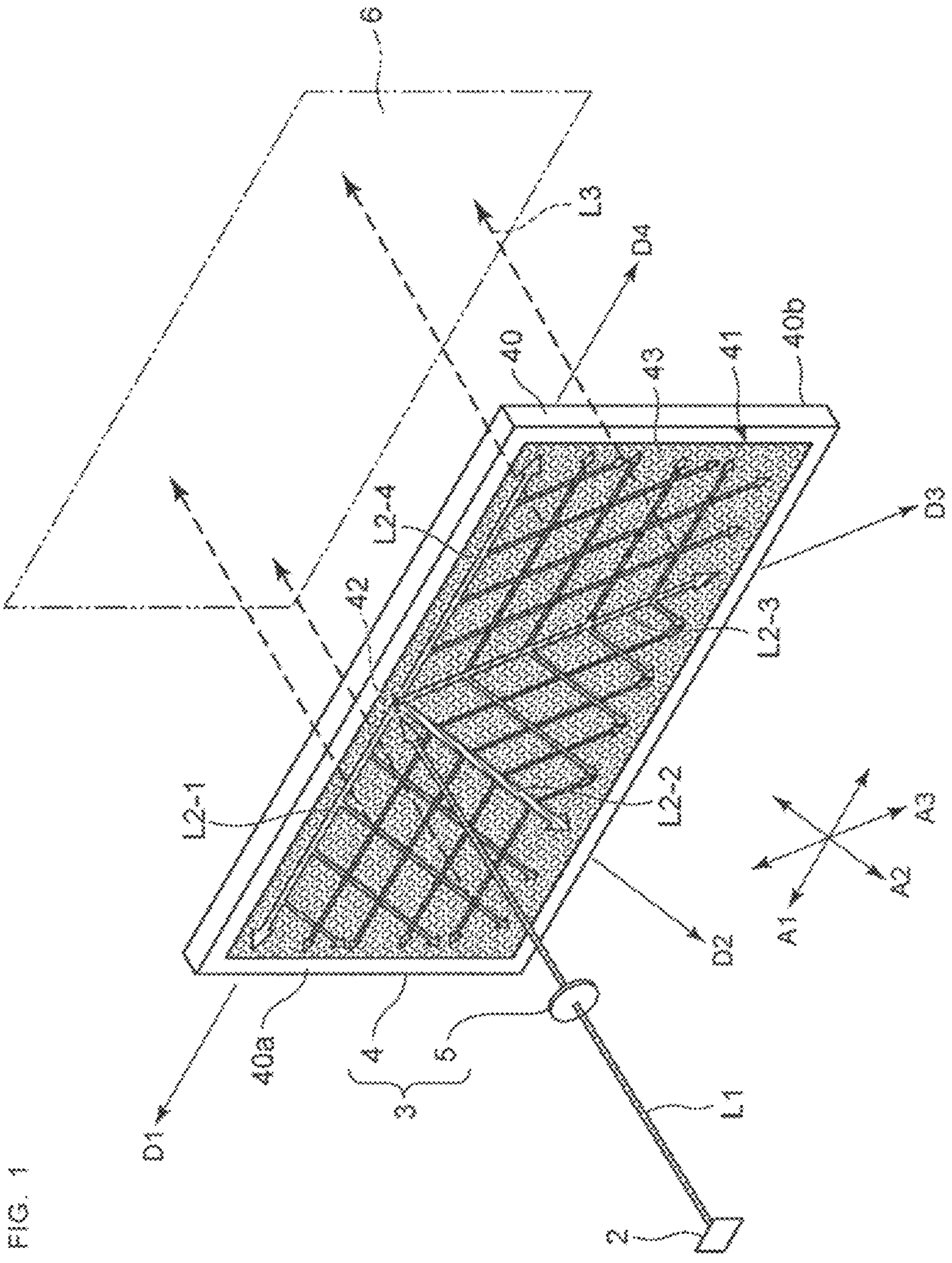
FIG. 1 is a schematic view of a configuration example of an image display device including an optical system according to one embodiment.

FIG. 1 is a schematic view of a configuration example of an image display device 1 according to one embodiment. The image display device 1 is, for example, a head mounted display (HMD) which is mounted on a user's head and displays an image (picture). In the present disclosure, a "direction of_axis" means a direction which passes an arbitrary point and is parallel to the_axis. In the present disclosure, expressions "travel in_direction" and "propagate in_direction" used in relation to light rays mean that a light ray forming an image travels in the_direction as a whole and therefore light beams included in the light ray forming the image may be permitted to be inclined relative to the _direction. For example, regarding a "light ray traveling in_direction", it is sufficient that a main light beam of this light is directed in the_direction, and auxiliary beams of this light may be inclined relative to the_direction.

As shown in FIG. 1, the image display device 1 includes a display element 2 and an optical system 3. The display element 2 is configured to output an image light ray L1 forming an image. The optical system 3 includes a light guide 4 and a projection optical system 5. The light guide 4 guides the image light ray L1 output from the display element 2 to a field of view region 6 of a user as a virtual image. The light guide 4 includes a body 40 having a plate shape and a periodic structure formed in the body 40. Herein, only for simplifying FIG. 1, the image light ray L1 is depicted as light with directivity. However, actually, the image light ray L1 is incident on the light guide 4 as light having an angle corresponding to a field of view.

Figure 2:
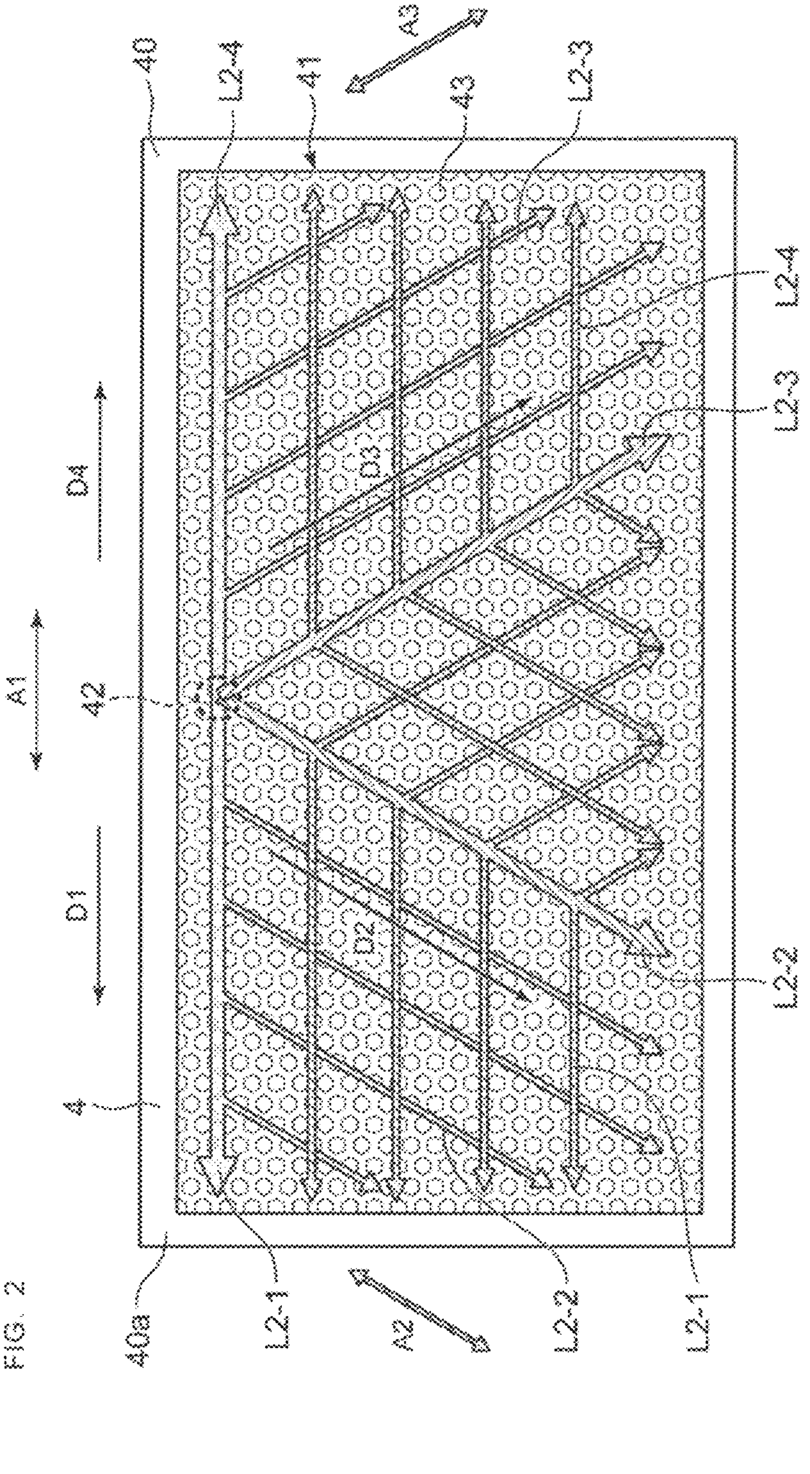
FIG. 2 is a schematic plan view of a configuration example of a light guide of the optical system of FIG. 1.
Figure 3:
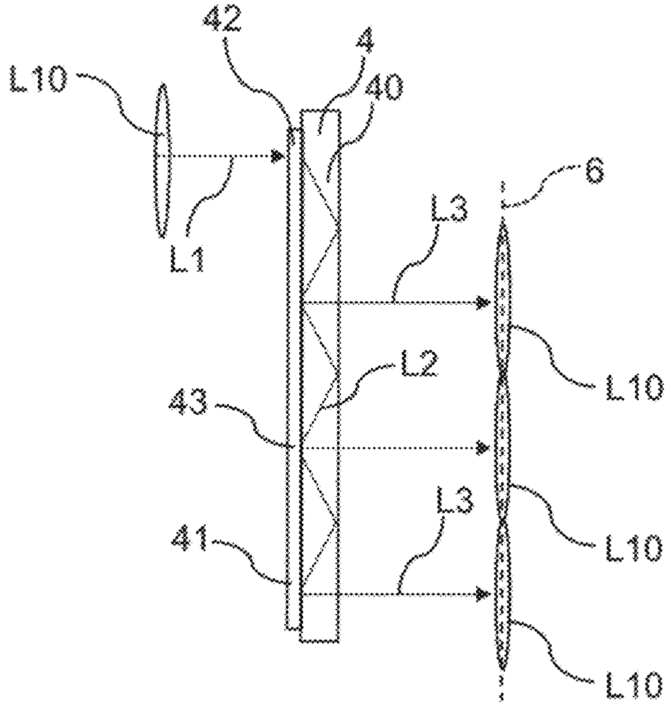
FIG. 3 is a schematic side view of the configuration example of the light guide of the optical system of FIG. 1.

FIG. 2 is a schematic plan view of a configuration example of the light guide 4, and FIG. 3 is a schematic side view of the configuration example of the light guide 4. In FIG. 3, to show a function of pupil expansion of the image display device 1 in an understandable manner, a pupil L10 is depicted instead of the display element 2 and the projection optical system 5.

As shown in FIG. 2, the periodic structure 41 of the light guide 4 has periodicity in three predetermined directions A1, A2, A3 intersecting each other within a predetermined plane perpendicular to the thickness direction of the body 40. The periodic structure 41 includes an in-coupling region 42 and an exit region 43. The in-coupling region 42 divides the image light ray L1 into a plurality of the image light rays and allowing the plurality of image light rays to propagate within the body 40 in a plurality of branch directions D1 to D4 including first, second, and third branch directions D1, D2, and D3 respectively parallel to the three predetermined directions A1, A2, A3, as shown in FIG. 2. The exit region 43 allows the plurality of image light rays L2-1 to L2-4 (hereinafter, collectively designated by reference sign L2) propagating within the body 40 in the plurality of branch directions D1 to D4 to emerge from the body 40 toward the field of view region 6.

Apparently, in the light guide 4, the in-coupling region 42 divides the image light ray L1 into a plurality of the image light rays and allowing the plurality of image light rays to propagate inside the body 40 in the plurality of branch directions D1 to D4 including the first, second, and third branch directions D1, D2, and D3 respectively parallel to the three predetermined directions A1, A2, A3, and the exit region 43 allows the plurality of image light rays L2-1 to L2-4 propagating within the body 40 in the plurality of branch directions D1 to D4 to emerge from the body 40 toward the field of view region 6. As described above, the light guide 4 reproduces a pupil of the image light ray L1 to expand the pupil by: dividing the image light ray L1 into a plurality of the image light rays in the plurality of branch directions D1 to D4; further dividing the plurality of image light rays into a plurality of the image light rays L3 parallel to each other; and allowing the plurality of image light rays L3 to emerge toward the field of view region 6. In summary, in the light guide 4, the periodic structure 41 functions as the in-coupling region 42 and the exit region 43 and therefore enables expansion of the pupil by the periodic structure 41 only. Therefore, there is no need to employ two or three diffraction optical elements, differently from U.S. Pat. No. 10,429,645 and US 2020/0209630. This leads to downsizing the light guide 4.

1.2 Details

Hereinafter, the image display device 1 according to the present embodiment will be described in detail with reference to FIG. 1 to FIG. 9. As shown in FIG. 1, the image display device 1 includes the display element 2 and the optical system 3.

The display element 2 is configured to, in order to display an image (picture), output the image light ray L1 for forming the image. The image light ray L1 includes light beams output from respective points of the display element 2. The respective points of the display element 2 correspond to respective pixels of the display element 2, for example. The optical axis of the image light ray L1 is an optical axis of a light ray output from a center of the display element 2, for example. Examples of the display element 2 may include known displays such as liquid crystal displays, organic EL displays, scanning MEMS mirrors, or the like.

As shown in FIG. 1, the optical system 3 is configured to guide the image light ray L1 output from the display element 2 toward the field of view region 6 set relative to eyes of the user. Within the field of view region 6, the user can watch by his or her own eyes the image formed by the display element 2 with the image not being interrupted. Especially, in the present embodiment, the optical system 3 expands the field of view region 6 by utilizing effects of pupil expansion.

As shown in FIG. 1, the optical system 3 includes the light guide 4 and the projection optical system 5.

The light guide 4 is configured to guide the image light ray L1 which is output from the display element 2 and forms the image, toward the field of view region 6 as a virtual image. The light guide 4 includes the body 40 having a plate shape and the periodic structure 41.

The body 40 is made of transparent material and includes a first surface 40*a* and a second surface 40*b* in a thickness direction thereof. In the present embodiment, the body 40 has a rectangular plate shape. As shown in FIG. 1, the body 40 is positioned or arranged to direct the first surface 40*a* toward the display element 2 and direct the second surface 40*b* toward the field of view region 6.

The periodic structure 41 is formed in the first surface 40*a* of the body 40. The periodic structure 41 is a rectangular region formed in the first surface 40*a* of the body 40, for example. As shown in FIG. 2, the periodic structure 41 has periodicity in three predetermined directions A1, A2, A3 intersecting each other within a predetermined plane perpendicular to the thickness direction of the body 40. In the present embodiment, the three predetermined directions A1, A2, A3 are not perpendicular to each other. Periods of the periodic structure 41 in the individual three predetermined directions A1, A2, A3 are constant and identical to each other. In FIG. 2, the predetermined direction A1 corresponds to a length direction of the body 40. Based on a counterclockwise direction in FIG. 2 (that is, a counterclockwise direction when the light guide 4 is viewed in a direction in which the image light ray L1 is incident on the light guide 4), the predetermined direction A2 intersects the predetermined direction A1 at a predetermined angle (e.g., 60 degrees) and the predetermined direction A3 intersects the predetermined direction A1 at a different predetermined angle (e.g., 120 degrees).

Figure 4:
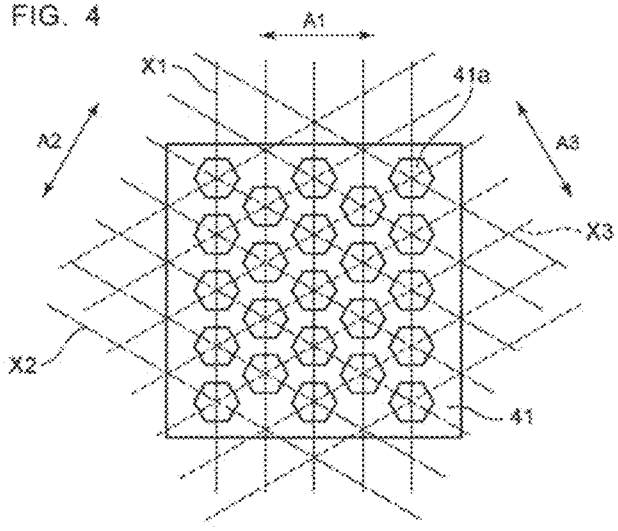
FIG. 4 is a plan view of a configuration example of a periodic structure of the light guide of FIG. 2.
Figure 5:
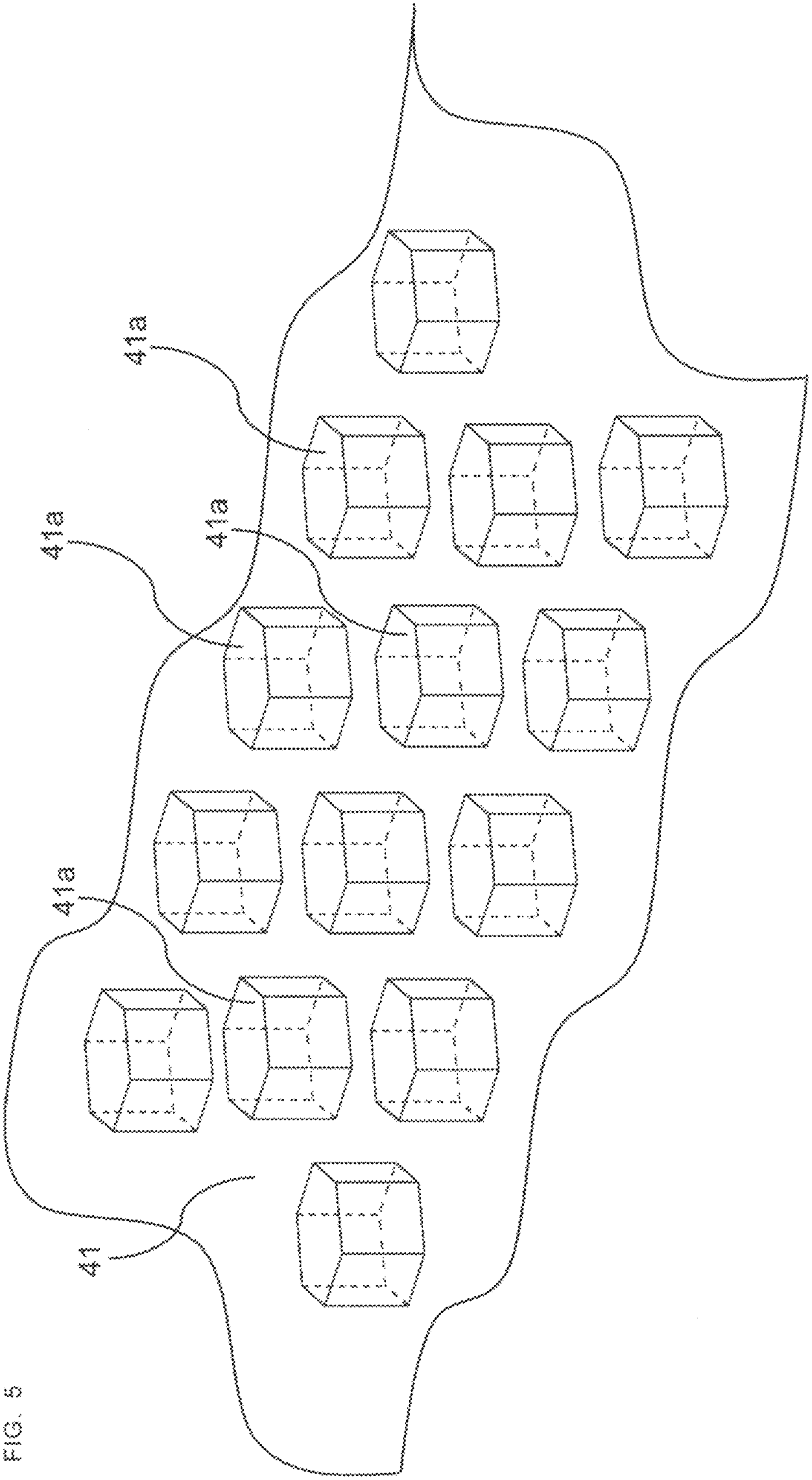
FIG. 5 is a perspective view of the configuration example of the periodic structure of the light guide of FIG. 2.

FIG. 4 is a plan view of a configuration example of the periodic structure 41 and FIG. 5 is a perspective view of the configuration example of the periodic structure 41. The periodic structure 41 includes a diffraction grating constituted by recessed or protruded parts 41*a* in relation to the thickness direction of the body 40 which are arranged within the predetermined plane to have periodicity in the three predetermined directions A1, A2, A3. In detail, as shown in FIG. 4, in the periodic structure 41, the recessed or protruded parts 41*a* are arranged to satisfy following conditions (1) to (3). The condition (1) specifies that in the predetermined direction A1, rows of the recessed or protruded parts 41*a* arranged in a direction X1 perpendicular to the predetermined direction A1 are arranged at a regular interval. Satisfying the condition (1) allows the periodic structure 41 to function as a diffraction grating for diffracting light into the predetermined direction A1. The condition (2) specifies that in the predetermined direction A2, rows of the recessed or protruded parts 41*a* arranged in a direction X2 perpendicular to the predetermined direction A2 are arranged at a regular interval. Satisfying the condition (2) allows the periodic structure 41 to function as a diffraction grating for diffracting light into the predetermined direction A2. The condition (3) specifies that in the predetermined direction A3, rows of the recessed or protruded parts 41*a* arranged in a direction X3 perpendicular to the predetermined direction A3 are arranged at a regular interval. Satisfying the condition (3) allows the periodic structure 41 to function as a diffraction grating for diffracting light into the predetermined direction A3. In the present embodiment, the recessed or protruded parts 41*a* are arranged in a hexagonal lattice, thereby satisfying the conditions (1) to (3). In the present embodiment, each recessed or protruded part 41*a* is a protrusion with a hexagonal shape in its plan view.

As shown in FIG. 2 and FIG. 3, the periodic structure 41 includes the in-coupling region 42 and the exit region 43. In particular, the periodic structure 41 is formed not to include a region separating the in-coupling region 42 and the exit region 43 between the in-coupling region 42 and the exit region 43.

Examples of the region separating the in-coupling region 42 and the exit region 43 may include a region where no recessed or protruded part 41*a* is present, or a region where recessed or protruded structure different from the recessed or protruded parts 41*a* is present. In other words, the periodic structure 41 is formed so that the in-coupling region 42 and the exit region 43 are not discontinuous but consecutive smoothly. This enables simplification of the structure of the periodic structure 41.

The in-coupling region 42 is a region on which the image light ray L1 from the display element 2 is incident, in the periodic structure 41. Therefore, the in-coupling region 42 is defined by a group of recessed or protruded parts 41*a* which is of the recessed or protruded parts 41*a* arranged within the predetermined plane to have periodicity in the three predetermined directions A1, A2, A3 and is within a region on which the image light ray L1 from the display element 2 is incident.

The in-coupling region 42 is used for coupling between the display element 2 and the light guide 4. The in-coupling region 41 allows external light ray (the image light ray L1) to be incident on the light guide 4 and propagate within the body 40 of the light guide 4 under a total reflection condition (see FIG. 3). The term "coupling" used herein means allowing propagation inside the body 40 of the light guide 4 under a total reflection condition.

The in-coupling region 42 is a partial region of the periodic structure 41 and thus has periodicity in the three predetermined directions A1, A2, A3. Accordingly, the in-coupling region 42 divides the image light ray L1 incident from the display element 2 into a plurality of the image light rays and allows the plurality of image light rays to propagate within the body 40 in a plurality of branch directions. The in-coupling region 42 is located at one end in a width direction of the periodic structure 41 and at a center in a length direction of the periodic structure 41. Thus, the plurality of branch directions include first, second and third branch directions D1, D2, D3 respectively parallel to the three predetermined directions A1, A2, A3. An angle between the first branch direction D1 and the third branch direction D3 is larger than an angle between the first branch direction D1 and the second branch direction D2. The plurality of branch directions further include a fourth branch direction D4. The fourth branch direction D4 is an opposite direction from the first branch direction D1. An angle between the first branch direction D1 and the fourth branch direction D4 is larger than the angle between the first branch direction D1 and the third branch direction D3. Concretely, the angle between the first branch direction D1 and the second branch direction D2 is 60 degrees, the angle between the first branch direction D1 and the third branch direction D3 is 120 degrees, and the angle between the first branch direction D1 and the fourth branch direction D4 is 180 degrees. The angles herein are defined so that a counterclockwise direction when the light guide 4 is viewed in a direction where the image light ray L1 is incident on the light guide 4 is a positive direction.

The in-coupling region 42 uses diffraction to allow the image light ray L1 to be incident on the body 40 of the light guide 4 to meet a condition where it is totally reflected by the first surface 40*a* and the second surface 40*b*. The in-coupling region 42 allows the image light ray L1 to travel in a direction of the first axis (the X axis in the present embodiment) within the light guide 4 (i.e., the body 40) while being totally reflected by the first surface 40*a* and the second surface 40*b*. Further, the in-coupling region 42 is arranged side by side with the exit region 43 in each of the three predetermined directions A1, A2, A3. Consequently, an entire image light ray L2 from the in-coupling region 42 is incident on the exit region 43 and this can improve a transfer efficiency from the in-coupling region 42 to the exit region 43.

The in-coupling region 42 allows the image light ray L1 to travel in each of the plurality of branch directions D1 to D4 within the body 40 of the light guide 4 while being totally reflected by the first surface 40*a* and the second surface 40*b*. As described above, the in-coupling region 42 allows image light rays L2-1 to L2-4 propagating within the body in the plurality of branch directions D1 to D4 respectively to branch off from the image light ray L1. In other words, as shown in FIG. 2, the in-coupling region 42 divides the image light ray L1 into the image light rays L2-1 to L2-4 propagating within the body in the plurality of branch directions D1 to D4 respectively.

The exit region 43 is a region which allows image light rays L3 to emerge toward the field of view region 6, in the periodic structure 41. Especially, the exit region 43 is a region of the periodic structure 41 other than the in-coupling region 42. In the present embodiment, the exit region 43 is defined by a group of recessed or protruded parts 41*a* which is of the recessed or protruded parts 41*a* arranged within the predetermined plane to have periodicity in the three predetermined directions A1, A2, A3 but is not included in the in-coupling region 42.

The exit region 43 allows the image light rays L2-1 to L2-4 propagating within the body 40 in the plurality of branch directions D1 to D4, to emerge from the body 40 toward the field of view region 6. In detail, the exit region 43 allows each image light ray L2 from the in-coupling region 42 to propagate in its branch direction and allows part of each image light ray L2 to emerge from the light guide 4 toward the field of view region 6.

The exit region 43 is a partial region of the periodic structure 41 and thus has periodicity in the three predetermined directions A1, A2, A3. Accordingly, the exit region 43 allows part of the image light ray L2 to travel in a different branch direction from its original branch direction. FIG. 2 illustrates an example situation where a plurality of image light rays L2-2 traveling in the second branch direction D2 branch off from the image light rays L2-1 traveling from the in-coupling region 42 in the first branch direction D1. FIG. 2 illustrates an example situation where a plurality of image light rays L2-1, L2-3 traveling in the first and third branch directions D1, D3 branch off from the image light ray L2-2 traveling from the in-coupling region 42 in the second branch direction D2. FIG. 2 illustrates an example situation where a plurality of image light rays L2-2, L2-4 traveling in the second and fourth branch directions D2, D4 branch off from the image light ray L2-3 traveling from the in-coupling region 42 in the third branch direction D3. FIG. 2 illustrates an example situation where a plurality of image light rays L2-3 traveling in the third branch direction D3 branch off from the image light ray L2-4 traveling from the in-coupling region 42 in the fourth branch direction D4.

As described above, by the periodic structure 41, the image light ray L1 is divided within the body 40 into the plurality of image light rays L2-1 to L2-4 traveling respectively in the plurality of branch directions D1 to D4 and thus spreads within the predetermined plane perpendicular to the thickness direction of the body 40. Each of the plurality of image light rays L2-1 to L2-4 traveling respectively in the plurality of branch directions D1 to D4 is divided into a plurality of mutually parallel image light rays L3 (see FIG. 3) and thereby emerges from the body 40 toward the field of view region 6.

Each of the in-coupling region 42 and the exit region 43 is a partial region of the periodic structure 41 and thus has periodicity in the three predetermined directions A1, A2, A3. Therefore, the in-coupling region 42 and the exit region 43 have the same periods in the three predetermined directions A1, A2, A3, individually. This enables simplification of the structure of the periodic structure 41.

In the light guide 4, individual wave vectors in the plurality of branch directions of the periodic structure 41 are set as follows. The individual wave vectors in the first, second, third and fourth branch directions D1, D2, D3, D4 of the periodic structure 41 are denoted by k1, k2, k3, k4. In the present embodiment, an n-th (n is integer equal to or greater than 3) branch direction is set so that an angle between the first branch direction and the n-th branch direction is larger than an angle between the first branch direction and an (n−1)th branch direction. The angles herein are defined so that a counterclockwise direction when the light guide 4 is viewed in a direction where the image light ray L1 is incident on the light guide 4 is a positive direction. For example, components of the wave vector are set based on an x-y plane defined by an x axis a direction of which is specified by the predetermined direction A1 and a y axis specified by a direction perpendicular to the predetermined direction A1 within the predetermined plane. In this regard, a center of the in-coupling region 42 may be selected as an origin of the x-y plane.

In the optical system 3, when the wave vectors in the first, second, and third branch directions D1, D2, D3 of the periodic structure 41 are denoted by k1, k2, k3, respectively, and a maximum value of absolute values of the wave vectors k1, k2, k3 in the first, second, and third branch directions D1, D2, D3 is denoted by km, the wave vectors k1, k2, k3 satisfy a relation of $|k1-k2+k3|<km/5$, preferably, $|k1-k2+k3|$ means an absolute value of a resultant vector represented by k1−k2+k3. In this regard, it is possible to reduce chromatic aberration of the image light ray L3 reaching the field of view region 6 of the user. This enables improvement of image quality. It is more preferable that the wave vectors k1, k2, k3 satisfy $|k1-k2+k3|<km/10$. In this case, even if a wavelength range of the image light ray L1 has a width of about ±2 nm, chromatic aberration perceived by the user can be reduced to about 1 minute of arc. This enables further improvement of image quality. It is more preferable that the wave vectors k1, k2, k3 satisfy $|k1-k2+k3|<km/50$. In this case, even if a wavelength range of the image light ray L1 has a width of about ±10 nm, chromatic aberration perceived by the user can be reduced to about 1 minute of arc. This enables further improvement of image quality. It is more preferable that the wave vectors k1, k2, k3 satisfy $|k1-k2+k3|=0$. In this case, an angle of the image light ray L1 incident on the in-coupling region 42 is identical to an angle of the image light ray L3 emerging from the exit region 43 toward the field of view region 6. It is possible to keep the angle of the image light ray L1 unchanged. This enables further improvement of image quality.

Figure 6:
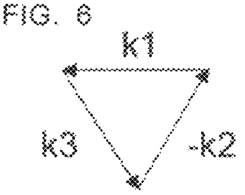
FIG. 6 is an explanatory view of an example of wave vectors of the periodic structure of the light guide of FIG. 2.
Figure 7:
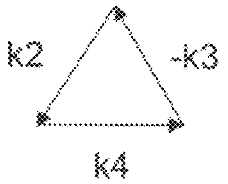
FIG. 7 is an explanatory view of an example of wave vectors of the periodic structure of the light guide of FIG. 2.
Figure 8:
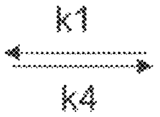
FIG. 8 is an explanatory view of an example of wave vectors of the periodic structure of the light guide of FIG. 2.

In the present embodiment, as shown in FIG. 6, the wave vectors k1, k2, k3 satisfy a relation of $|k1-k2+k3|=0$. The relation of $|k1-k2+k3|=0$ should not be interpreted in strict sense but may permit that k1−k2+k3 is regarded as 0. As shown in FIG. 7, the wave vectors k2, k3, k4 satisfy a relation of $|k4+k2-k3=0$. $|k4+k2-k3|$ is an absolute value of a resultant vector represented by k4+k2−k3. The relation of $|k4+k2-k3|=0$ should not be interpreted in strict sense but may permit that k4+k2−k3 is regarded as 0. As shown in FIG. 8, the wave vectors k1, k4 satisfy a relation of $|k1+k4|=0$. $|k1+k4|$ is an absolute value of a resultant vector represented by k1+k4. The relation of $|k1+k4|=0$ should not be interpreted in strict sense but may permit that k1+k4 is regarded as 0. In the present embodiment, the individual absolute values of the wave vectors k1, k2, k3, and k4 are identical to each other. Therefore, in the case where the image light ray L1 is incident on the in-coupling region 42 along the thickness direction of the body 40, it is possible to arrange the pupils L10 of the image light ray L1 at a regular interval in the field of view region 6. Especially, as shown in FIG. 3, in the case where the image light ray L1 is incident on the in-coupling region 42 along the thickness direction of the body 40, it is possible to arrange the pupils L10 of the image light ray L1 to reduce an area of the field of view region 6 where no pupil L10 is located.

As shown in FIG. 3, the aforementioned light guide 4 reproduces the pupil L10 of the image right ray L1 to expand the pupil L10 by: dividing the image light ray L1 entering the body 40 from the in-coupling region 42 within the body 40 into the plurality of image light rays L2 propagating in the plurality of branch direction; and further dividing the plurality of image light rays L2 propagating in the plurality of branch directions into a plurality of mutually parallel image light rays L3 to allow them to emerge toward the field of view region 6.

The projection optical system 5 projects the image light ray L1 which is output from the display element 2 and forms the image. Thus, the projection optical system 5 allows the image light ray L1 from the display element 2 to be incident on the light guide 4. As shown in FIG. 1 and FIG. 2, the projection optical system 5 is located between the display element 2 and the in-coupling region 42 of the light guide 4. The projection optical system 5 collimates the image light ray L1 from the display element 2 and allows it to be incident on the in-coupling region 42, for example. The projection optical system 5 allows the image light ray L1 to be incident on the in-coupling region 42 as substantial collimate light ray. The projection optical system 5 is, for example, a biconvex lens.

1.3 Simulations

Figure 9:
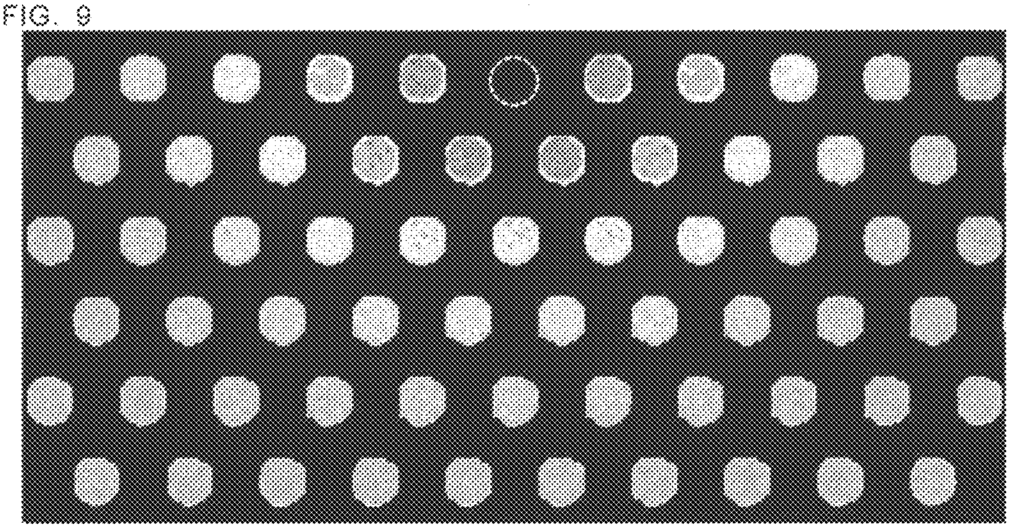
FIG. 9 is a diagram for illustration of a result of a simulation regarding light intensities of the light guide of FIG. 2.

To confirm effects of pupil expansion by the aforementioned light guide 4, a simulation was conducted for a distribution of light intensity at the periodic structure 41 of the light guide 4. FIG. 9 shows a result of the simulation regarding light intensities of the light guide 4. FIG. 9 shows a distribution of light intensity at each of plurality of parts set on the exit region 43 of the light guide 4 at a predetermined interval. In FIG. 9, part indicated by a white dashed circle corresponds to the in-coupling region 42. Herein, to show the effect of pupil in an understandable manner, a size of the pupil L10 of the image light ray L1 is set to prevent reproduced pupils from overlapping with each other. As apparent from FIG. 9, light is distributed over the entire exit region 43. In conclusion, it was confirmed that the pupil L10 of the image light ray L1 could be reproduced and expanded by the periodic structure 41 which has periodicity in the three predetermined directions A1, A2, A3 intersecting each other within the predetermined plane perpendicular to the thickness direction of the body 40.

1.4 Advantageous Effects

As described above, the optical system 3 includes the light guide 4 for guiding the image light ray L1 which is output from the display element 2 and forms the image, to the field of view region 6 of the user as the virtual image. The light guide 4 includes the body 40 having a plate shape and the periodic structure 41 formed in the body 40. The periodic structure 41 has periodicity in the three predetermined directions A1, A2, A3 intersecting each other within the predetermined plane perpendicular to the thickness direction of the body 40. The periodic structure 41 includes the in-coupling region 42 dividing the image light ray L1 incident from the display element 2 into a plurality of the image light rays L2 and allowing the plurality of image light rays to propagate within the body 40 in the plurality of branch directions including the first, second, and third branch directions D1, D2, D3 respectively parallel to the three predetermined directions A1, A2, A3, and the exit region 43 allowing the plurality of image light rays L2 propagating in the plurality of branch directions within the body 40 to emerge from the body 40 toward the field of view region 6. This configuration enables downsizing the light guide 4.

Further, in the optical system 3, the periodic structure 41 includes a diffraction grating constituted by the recessed or protruded parts 41*a* in relation to the thickness direction of the body 40 which are arranged within the predetermined plane to have periodicity. This configuration enables simplification of the structure of the light guide 4.

Further, in the optical system 3, the recessed or protruded parts 41*a* are arranged within the predetermined plane in a hexagonal lattice. This configuration enables downsizing the light guide 4.

Further, in the optical system 3, the in-coupling region 42 and the exit region 43 have the same period in each of the three predetermined directions A1, A2, A3. That is, a period in the predetermined directions A1, of the in-coupling region 42 is identical to a period in the predetermined directions A1, of the exit region 43; a period in the predetermined directions A2, of the in-coupling region 42 is identical to a period in the predetermined directions A2, of the exit region 43; and a period in the predetermined directions A3, of the in-coupling region 42 is identical to a period in the predetermined directions A3, of the exit region 43. In this case, the periods in the predetermined directions A1, A2, A3, of the in-coupling region 42 are not necessarily identical to each other and the periods in the predetermined directions A1, A2, A3, of the exit region 43 are not necessarily identical to each other. This configuration enables simplification of the structure of the light guide 4.

Further, in the optical system 3, when the wave vectors in the first, second, and third branch directions D1, D2, D3 of the periodic structure 41 are denoted by k1, k2, and k3, respectively, and a maximum value of absolute values of the wave vectors in the first, second, and third branch directions D1, D2, D3 is denoted by km, the wave vectors k1, k2, and k3 satisfy a relation of $|k1-k2+k3|<km/5$. This configuration enables improvement of image quality.

Further, in the optical system 3, the wave vectorsk1, k2, and k3 satisfy a relation of $|k1-k2+k3|=0$. This configuration enables improvement of image quality.

Further, in the optical system 3, the absolute values of the wave vectors k1, k2, and k3 are identical to each other. This configuration enables arranging the pupils L10 of the image light ray L1 at a regular interval in the field of view region 6.

Further, in the optical system 3, the light guide 4 reproduces the pupil L10 of the image right ray L1 to expand the pupil L10 by: converting the image light ray L1 entering the light guide 4 from the in-coupling region 42 into a plurality of image light rays in the plurality of branch directions allowed to propagate in the plurality of branch directions within the body 40; and dividing the plurality of image light rays into a plurality of mutually parallel image light rays L3 in each of the plurality of branch directions to be allowed to emerge toward the field of view region 6. This configuration enables downsizing the light guide 4.

Further, in the optical system 3, the in-coupling region 42 is arranged side by side with the exit region 43 in each of the three predetermined directions A1, A2, A3. This configuration enables improvement of the transfer efficiency of light from the in-coupling region 42 to the exit region 43.

Further, in the optical system 3, the periodic structure 41 is formed not to include a region separating the in-coupling region 42 and the exit region 43 between the in-coupling region 42 and the exit region 43. This configuration enables simplification of the structure of the periodic structure 41.

Further, the optical system 3 further includes the projection optical system 5 allowing the image light ray L1 to be incident on the in-coupling region 42 of the light guide 4 as a substantial collimate light ray. This configuration enables improvement of a use efficiency of the image light ray L1.

The aforementioned image display device 1 includes the aforementioned optical system 3 and the display element 2. This configuration enables downsizing the light guide 4.

2. Variations

Embodiments of the present disclosure are not limited to the above embodiment. The above embodiment may be modified in various ways in accordance with designs or the like to an extent that they can achieve the problem of the present disclosure. Hereinafter, some variations or modifications of the above embodiment will be listed. One or more of the variations or modifications described below may apply in combination with one or more of the others.

2.1 Variation 1

Figure 10:
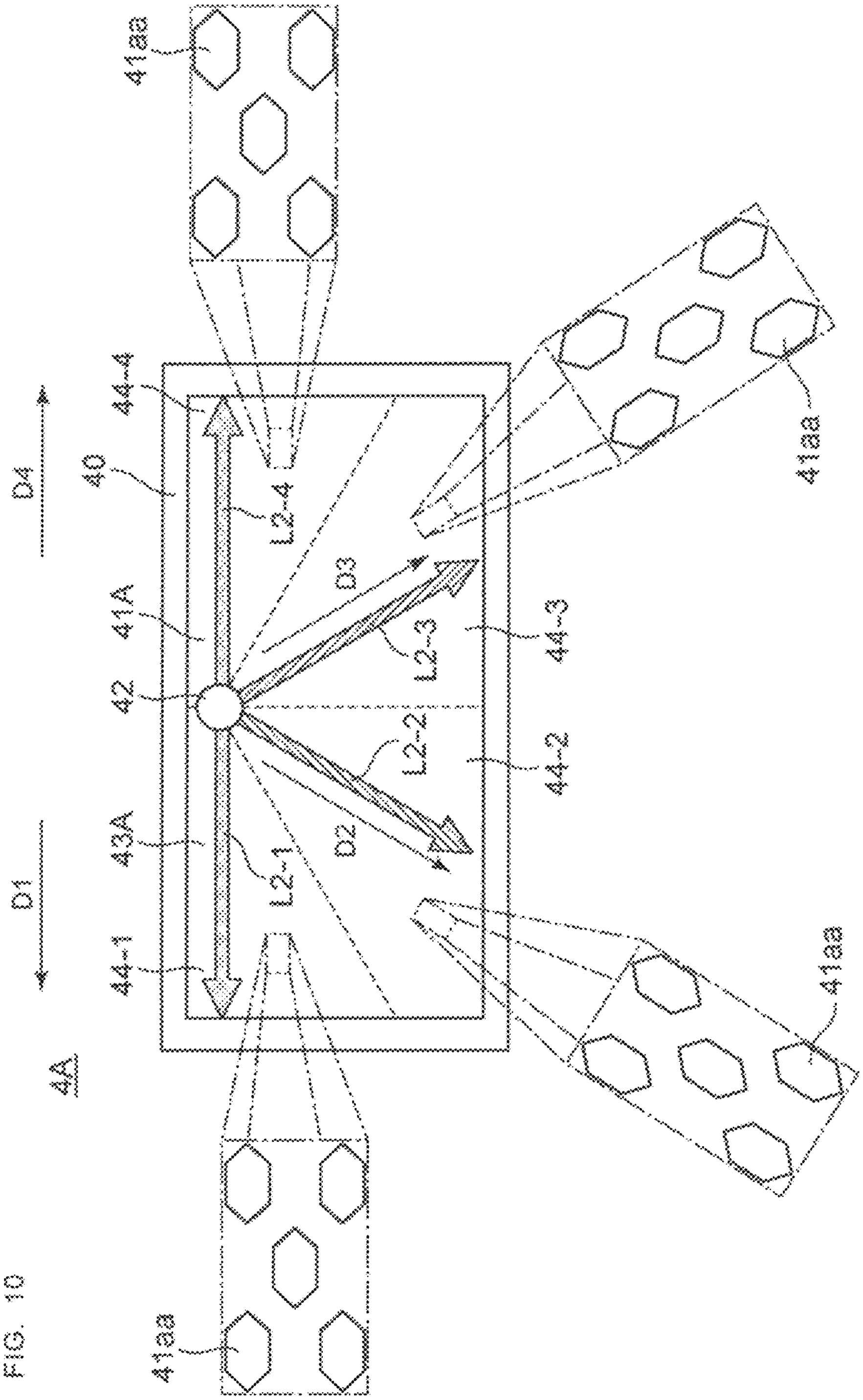
FIG. 10 is a plan view of a configuration example of a light guide of variation 1.

FIG. 10 is a schematic view of a configuration example of a light guide 4A of variation 1. The light guide 4A includes the body 40 and a periodic structure 41A.

The periodic structure 41A has periodicity in the three predetermined directions A1, A2, A3 intersecting each other within the predetermined plane perpendicular to the thickness direction of the body 40. Similarly to the periodic structure 41 of the above embodiment, the periodic structure 41A includes a diffraction grating constituted by recessed or protruded parts 41*aa* in relation to the thickness direction of the body 40 which are arranged within the predetermined plane to have periodicity in the three predetermined directions A1, A2, A3. In variation 1, shapes of the recessed or protruded parts 41*aa* of the periodic structure 41A are different depending on a position inside the periodic structure 41A. Accordingly, the periodic structure 41A includes regions with different diffraction efficiencies for light rays under the same condition. The light rays under the same condition are light rays which are the same in at least a wavelength and an incident angle, for example. Hereinafter, the periodic structure 41A will be described in more detail.

The periodic structure 41A of FIG. 10 includes the in-coupling region 42 and an exit region 43A.

In the in-coupling region 42, similarly to the above embodiment shown in FIG. 4, each recessed or protruded part 41*aa* is a protrusion with a hexagonal shape in its plan view. Therefore, the in-coupling region 42 divides the image light ray L1 into the image light rays L2-1 to L2-4 propagating within the body 40 in the plurality of branch directions D1 to D4. The in-coupling region 42A diffracts the image light ray L1 in the first, second, third, and fourth branch directions D1, D2, D3, D4.

The exit region 43A includes a plurality of (four, in the illustrated example) exit parts 44-1 to 44-4 (hereinafter, collectively designated by the reference sign 44). The plurality of exit parts 44 are adjacent to the in-coupling region 42 in the plurality of branch directions, individually. In detail, the exit part 44-1 is adjacent to the in-coupling region 42 in the first branch direction D1. The exit part 44-2 is adjacent to the in-coupling region 42 in the second branch direction D2. The exit part 44-3 is adjacent to the in-coupling region 42 in the third branch direction D3. The exit part 44-4 is adjacent to the in-coupling region 42 in the fourth branch direction D4.

In each exit part 44, larger than a diffraction efficiency of diffracting the image light ray L2 propagating in an adjacent direction in which the exit part 44 and the in-coupling region 42 are adjacent to each other (hereinafter, referred to as "exit diffraction efficiency" just for making distinction easier) is a diffraction efficiency of diffracting the image light ray L2 propagating in the adjacent direction into a predetermined branch direction different from the adjacent direction (hereinafter, referred to as "branch diffraction efficiency" just for making distinction easier). In more detail, regarding the exit part 44-1, a branch diffraction efficiency of diffracting the image light ray L2-1 into the second branch direction D2 is larger than an exit diffraction efficiency of diffracting the image light ray L2-1 propagating in the first branch direction D1 into a direction toward the field of view region 6. Regarding the exit part 44-2, a branch diffraction efficiency of diffracting the image light ray L2-2 into the first or third branch direction D1 or D3 is larger than an exit diffraction efficiency of diffracting the image light ray L2-2 propagating in the second branch direction D2 into a direction toward the field of view region 6. Regarding the exit part 44-3, a branch diffraction efficiency of diffracting the image light ray L2-3 into the second or fourth branch direction D2 or D4 is larger than an exit diffraction efficiency of diffracting the image light ray L2-3 propagating in the third branch direction D3 into a direction toward the field of view region 6. Regarding the exit part 44-4, a branch diffraction efficiency of diffracting the image light ray L2-4 into the third branch direction D3 is larger than an exit diffraction efficiency of diffracting the image light ray L2-4 propagating in the fourth branch direction D4 into a direction toward the field of view region 6. Accordingly, the image light rays L2-1 from the in-coupling region 42 can be suppressed from emerging toward the field of view region 6 before spreading over the exit region 43A. Thus, light intensity distribution at the field of view region 6 can be uniformed.

Each exit part 44 is part of the periodic structure 41A and therefore includes the recessed or protruded parts 41*aa* arranged within the predetermined plane to have periodicity in the three predetermined directions A1, A2, A3. A relation between the exit diffraction efficiency and the branch diffraction efficiency in each exit part 44 can be set by adjusting the shapes of the recessed or protruded parts 41*aa*. In each exit part 44, a ratio of a size of the recessed or protruded parts 41*aa* relative to a period of arrangement of the recessed or protruded parts 41*aa* is larger in a direction perpendicular to a branch direction different from a branch direction of the plurality of branch direction D1 to D4, in which a corresponding exit part 44 is adjacent to the in-coupling region 42, than in a direction perpendicular to the branch direction of the plurality of the branch direction, in which the corresponding exit part 44 is adjacent to the in-coupling region 42. In summary, in each exit part 44, the ratio of the size of the recessed or protruded parts 41*aa* relative to the period of arrangement of the recessed or protruded parts 41*aa* is set to be larger in a direction perpendicular to a predetermined branch direction within the predetermined plane than in a direction perpendicular to the adjacent direction within the predetermined plane. By doing so, the branch diffraction efficiency can be made larger than the exit diffraction efficiency.

Figure 11:
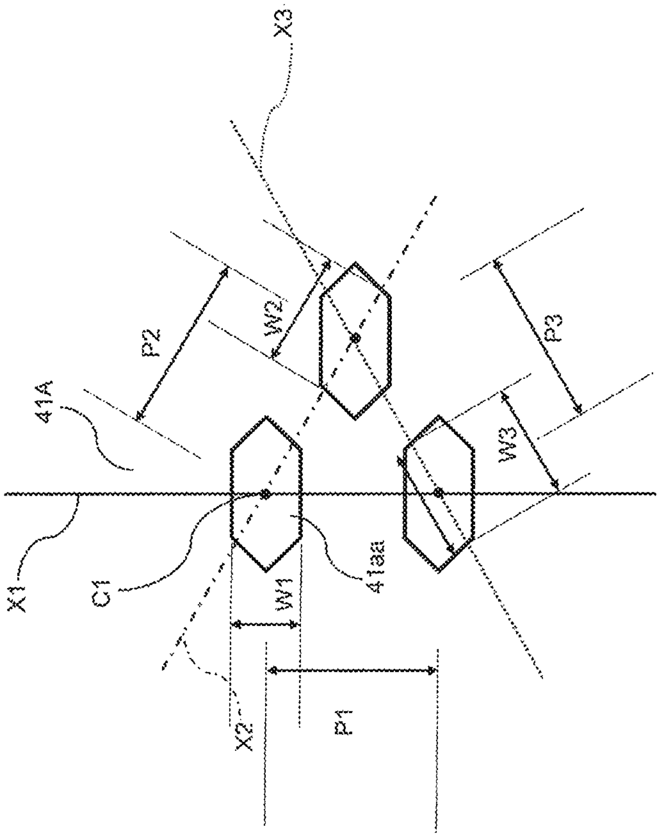
FIG. 11 is an explanatory view of an exit part of a periodic structure of the light guide of variation 1.

FIG. 11 is an explanatory view of the exit parts 44. In FIG. 11, periods P1, P2, P3 denote periods (grating periods) of arrangement of the recessed or protruded parts 41*aa* in the directions X1, X2, X3 perpendicular to the predetermined directions A1, A2, A3, respectively. Especially, the periods P1, P2, P3 are distances between central axes C1 of the recessed or protruded parts 41*aa* in the directions X1, X2, X3 perpendicular to the predetermined directions A1, A2, A3, respectively. Sizes W1, W2, W3 represent sizes (grating width) of the recessed or protruded parts 41*aa* in the directions X1, X2, X3 perpendicular to the predetermined directions A1, A2, A3, respectively. The ratios of the sizes W1, W2, W3 of the recessed or protruded parts 41*aa* relative to the periods P1, P2, P3 of arrangement of the recessed or protruded parts 41*aa* are denoted by ratios R1(=W1/P1), R2(=W2/P2), R3(=W3/P3), respectively. In each exit part 44, appropriately setting the ratios R1, R2, R3 enables adjustment of the relation between the exit diffraction efficiency and the branch diffraction efficiency.

Hereinafter, examples of conditions satisfied by the ratios R1, R2, R3 in each exit part 44 are shown. In the exit part 44-1, the shapes of the recessed or protruded parts 41*aa* are set so that the ratios R1, R2, R3 satisfy relations of $0.1<R1/R2<0.8$ and $0.1<R1/R3<0.8$. By doing so, it is possible to decrease an amount of the image light ray L2-1 propagating in the first branch direction D1 and increase an amount of the image light ray L2-2 propagating in the second branch direction D2. In the exit part 44-2, the shapes of the recessed or protruded parts 41*aa* are set so that the ratios R1, R2, R3 satisfy relations of $0.1<R2/R1<0.8$ and $0.1<R2/R3<0.8$. By doing so, it is possible to decrease an amount of the image light ray L2-2 propagating in the second branch direction D2 and increase amounts of the image light rays L2-1, L2-3 propagating in the first and third branch directions D1, D3. In the exit part 44-3, the shapes of the recessed or protruded parts 41*aa* are set so that the ratios R1, R2, R3 satisfy relations of $0.1<R3/R1<0.8$ and $0.1<R3/R2<0.8$. By doing so, it is possible to decrease an amount of the image light ray L2-3 propagating in the third branch direction D3 and increase amounts of the image light rays L2-2, L2-4 propagating in the second and fourth branch directions D2, D4. In the exit part 44-4, the shapes of the recessed or protruded parts 41*aa* are set so that the ratios R1, R2, R3 satisfy relations of $0.1<R1/R2<0.8$ and $0.1<R1/R3<0.8$. By doing so, it is possible to decrease an amount of the image light ray L2-4 propagating in the fourth branch direction D4 and increase an amount of the image light ray L2-3 propagating in the third branch direction D3.

As described above, in the light guide 4A, although the in-coupling region 42 has the same diffraction efficiency in the branch directions D1 to D4, the exit parts 44-1 to 44-4 of the exit region 43A have different diffraction efficiencies in the branch directions D1 to D4. This means that the in-coupling region 42 and the exit region 43A have different diffraction efficiencies in at least one of the plurality of branch directions. The diffraction efficiency of the in-coupling region 42A affects a coupling efficiency for coupling light with the body 40A and the diffraction efficiency of the exit region 43 affects an exit efficiency for allowing light to emerge from the body 40A. The coupling efficiency and the exit efficiency can have different values when the in-coupling region 42A and the exit region 43A have different diffraction efficiency. Therefore, this configuration enables setting the coupling efficiency and the extraction efficiency to different values.

Further, the exit region 43A includes the plurality of exit parts 44-1 to 44-4 adjacent to the in-coupling region 42 in the plurality of branch directions, individually. At least two of the plurality of exit parts 44-1 to 44-4 have different diffraction efficiencies for incident light under the same condition. For example, the exit part 44-1 is configured so that an efficiency of allowing a light ray to branch off from a light ray propagating along the branch direction D1 into the branch direction D2. The exit part 44-2 is configured so that an efficiency of allowing light rays to branch off from a light ray propagating along the branch direction D2 into the branch directions D1, D3. The exit part 44-3 is configured so that an efficiency of allowing light rays to branch off from a light ray propagating along the branch direction D3 into the branch directions D2, D4. The exit part 44-4 is configured so that an efficiency of allowing a light ray to branch off from a light ray propagating along the branch direction D4 into the branch direction D3. This configuration enables adjustment of light intensity distribution at the field of view region 6.

Further, in each of the plurality of exit parts 44, larger than the exit diffraction efficiency of diffracting the image light ray L2 propagating in the adjacent direction in which the in-coupling region 42 and the exit part 44 are adjacent to each other, into a direction toward the field of view region 6, is the branch diffraction efficiency of diffracting the image light ray L2 propagating in the adjacent direction into a predetermined branch direction which is one of the plurality of branch directions and is different from the adjacent direction. This configuration enables improvement of uniformity of light intensity distribution at the field of view region 6.

Further, each exit part 44 includes the recessed or protruded parts 41*aa* arranged within the predetermined plane to have periodicity in the three predetermined directions A1, A2, A3. The ratio of the size of the recessed or protruded parts 41*aa* relative to the period of arrangement of the recessed or protruded parts 41*aa* is larger in a direction perpendicular to the predetermined branch direction within the predetermined plane than in a direction perpendicular to the adjacent direction within the predetermined plane. This configuration enables improvement of uniformity of light intensity distribution at the field of view region 6 with a simplified structure.

2.2 Variation 2

Figure 12:
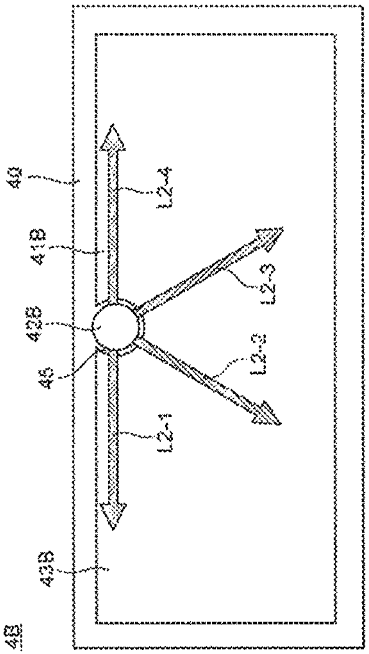
FIG. 12 is an explanatory view of a light guide of variation 2.

FIG. 12 is a schematic view of a configuration example of a light guide 4B of variation 2. The light guide 4B of FIG. 12 includes the body 40 and a periodic structure 41B. The periodic structure 41B is different from the periodic structure 41 of the light guide 4. Similarly to the periodic structure 41, the periodic structure 41B includes a diffraction grating constituted by the recessed or protruded parts 41*a* arranged within the predetermined plane to have periodicity in the three predetermined directions A1, A2, A3. Therefore, similarly to the periodic structure 41, the periodic structure 41B includes an in-coupling region 42B and an exit region 43B. The periodic structure 41B further includes an intermediate region 45. The intermediate region 45 is a region for separating the in-coupling region 42B and the exit region 43B from each other. In the intermediate region 45, no recessed or protruded part 41*a* is located. In variation 2, the periodic structure 41B is not formed to allow the in-coupling region 42B and the exit region 43B to be consecutive to each other. Therefore, it is easy to distinguish the in-coupling region 42B and the exit region 43B from each other. This enables facilitating assembly of the optical system 3.

2.3 Variation 3

Figure 13:
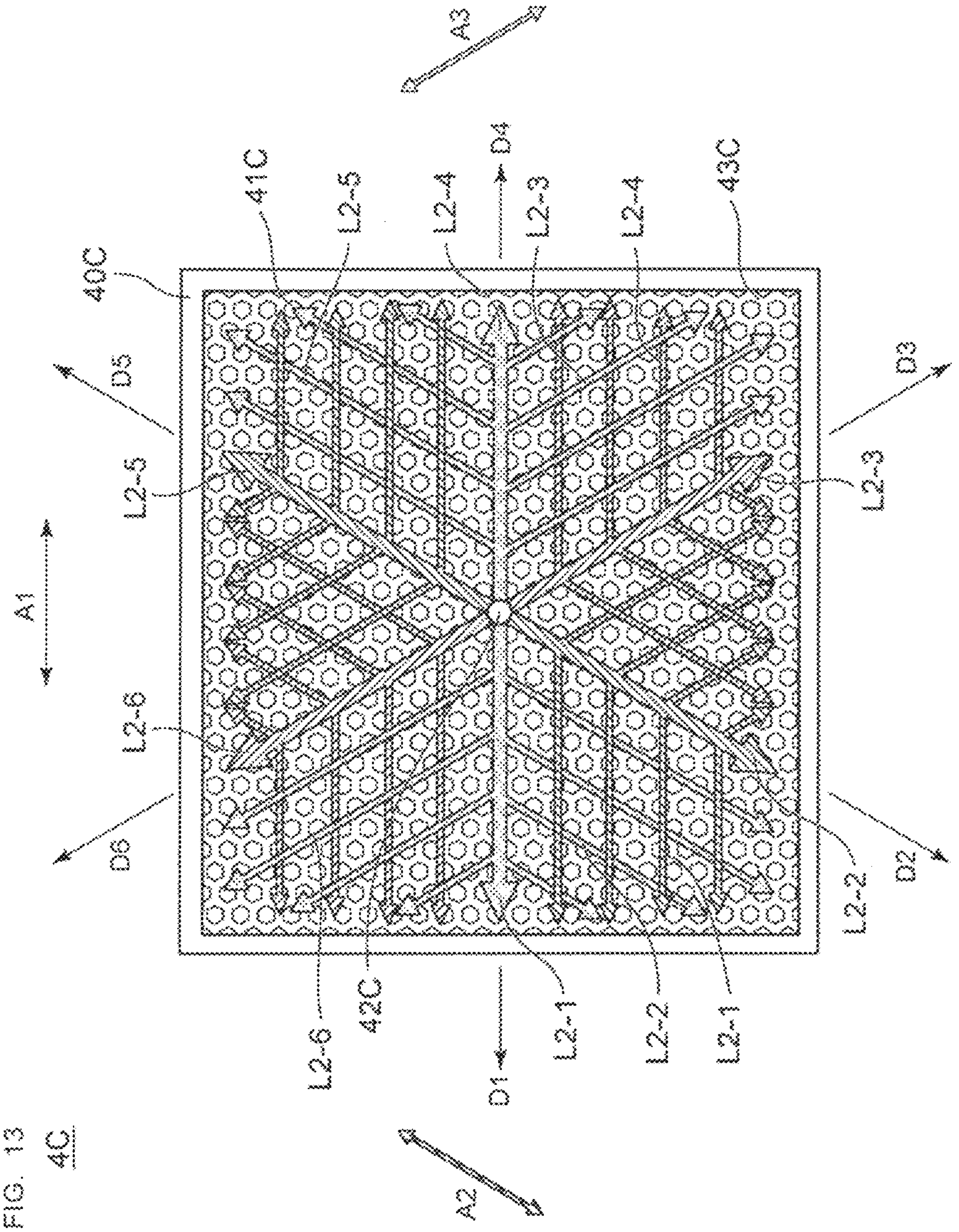
FIG. 13 is an explanatory view of a light guide of variation 3.

FIG. 13 is a schematic view of a configuration example of a light guide 4C of variation 3. The light guide 4C of FIG. 13 includes a body 40C having a plate shape and a periodic structure 41C. The body 40C of FIG. 13 has a square plate shape and the periodic structure 41C is a square region formed in the body 40C.

Similarly to the periodic structure 41, the periodic structure 41B of FIG. 13 includes a diffraction grating constituted by the recessed or protruded parts 41*a* in relation to the thickness direction of the body 40C arranged within the predetermined plane to have periodicity in the three predetermined directions A1, A2, A3. The periodic structure 41C of FIG. 13 includes an in-coupling region 42C and an exit region 43C.

The in-coupling region 42C divides the image light ray L1 incident from the display element 2 into a plurality of light rays and allows the plurality of light rays to propagate within the body 40C in a plurality of branch directions. The in-coupling region 42C is located at a center of the periodic structure 41C. Therefore, the plurality of branch directions includes the first, second and third branch directions D1, D2, D3 respectively parallel to the three predetermined directions A1, A2, A3 and further includes fourth, fifth and sixth branch directions D4, D5, D6 respectively parallel to the three predetermined directions A1, A2, A3. The fourth branch direction D4 is an opposite direction from the first branch direction D1. The fifth branch direction D5 is an opposite direction from the second branch direction D2. The sixth branch direction D6 is an opposite direction from the third branch direction D3. An angle between the first branch direction D1 and the fifth branch direction D5 is larger than the angle between the first branch direction D1 and the fourth branch direction D4. An angle between the first branch direction D1 and the sixth branch direction D6 is larger than the angle between the first branch direction D1 and the fifth branch direction D5. Concretely, the angle between the first branch direction D1 and the second branch direction D2 is 60 degrees, the angle between the first branch direction D1 and the third branch direction D3 is 120 degrees, the angle between the first branch direction D1 and the fourth branch direction D4 is 180 degrees, the angle between the first branch direction D1 and the fifth branch direction D5 is 240 degrees, and the angle between the first branch direction D1 and the sixth branch direction D6 is 300 degrees. The angles herein are defined so that a counterclockwise direction when the light guide 4C is viewed in a direction where the image light ray L1 is incident on the light guide 4C is a positive direction.

The in-coupling region 42C divides the image light ray L1 into image light rays L2-1 to L2-6 propagating within the body 40C in the plurality of branch directions D1 to D6. In other words, the in-coupling region 42C allows the image light rays L2-1 to L2-6 propagating within the body 40C in the plurality of branch directions D1 to D6 to branch off from the image light ray L1.

The exit region 43C allows the image light rays L2-1 to L2-6 propagating within the body 40C in the plurality of branch directions D1 to D6, to emerge from the body 40C toward the field of view region 6. In detail, the exit region 43C allows each image light ray L2 from the in-coupling region 42C to propagate in its branch direction and allows part of each image light ray L2 to emerge from the light guide 4C toward the field of view region 6.

As described above, by the periodic structure 41C, the image light ray L1 is divided within the body 40C into the plurality of image light rays L2-1 to L2-6 traveling respectively in the plurality of branch directions and thus spreads within the predetermined plane perpendicular to the thickness direction of the body 40C. Each of the plurality of image light rays L2-1 to L2-6 traveling respectively in the plurality of branch directions D1 to D6 is divided into a plurality of mutually parallel image light rays and thereby emerges from the body 40C toward the field of view region 6.

In the light guide 4C, wave vectors in the plurality of branch directions, of the periodic structure 41C are set as follows. The individual wave vectors in the first to sixth branch directions D1 to D6 of the periodic structure 41 are denoted by k1 to k6. In variation 3, an n-th (n is integer equal to or greater than 3) branch direction is set so that an angle between the first branch direction and the n-th branch direction is larger than an angle between the first branch direction and an (n−1)th branch direction. The angles herein are defined so that a counterclockwise direction when the light guide 4C is viewed in a direction where the image light ray L1 is incident on the light guide 4C is a positive direction. For example, components of the wave vector are set based on an x-y plane defined by an x axis a direction of which is specified by the predetermined direction A1 and a y axis specified by a direction perpendicular to the predetermined direction A1 within the predetermined plane. In this regard, a center of the in-coupling region 42C may be selected as an origin of the x-y plane.

Also in variation 3, the wave vectors k1, k2, k3 satisfy a relation of $|k1-k2+k3|=0$. The wave vectors k2, k3, k4 satisfy a relation of $|k4+k2-k3|=0$. The wave vectors k1, k4 satisfy $k=-k4$. The wave vectors k2, k5 satisfy $k2=-k5$. The wave vectors k3, k6 satisfy $k3=-k6$. In variation 2, the individual absolute values of the wave vectors k1 to k6 are identical to each other. This configuration enables arranging the pupils L10 of the image light ray L1 at a regular interval in the field of view region 6.

As described above, in the light guide 4C, the plurality of branch directions includes further the fifth and sixth branch directions D5, D6. When a wave vector in the fifth branch direction D5, of the periodic structure 41C is denoted by k5, $k5=-k2$. When a wave vector in the sixth branch direction D6, of the periodic structure 41C is denoted by k6, $k6=-k3$. This configuration enables expansion of the field of view region 6.

2.4 Variation 4

Figure 14:
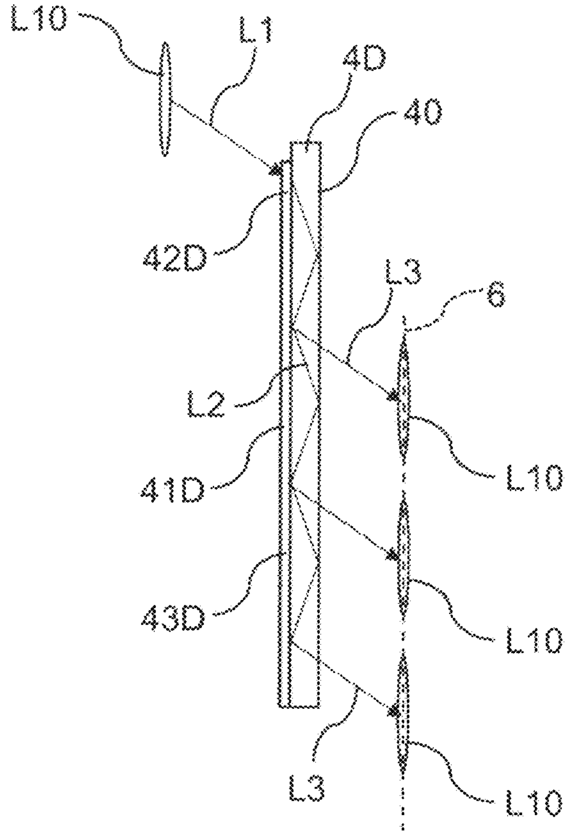
FIG. 14 is an explanatory view of a configuration example of an optical system of variation 4.

FIG. 14 is a schematic view of a configuration example of a light guide 4D of variation 4. In FIG. 14, to show a function of pupil expansion of the image display device in an understandable manner, the pupil L10 is depicted instead of the display element 2 and the projection optical system 5. In FIG. 14, the light guide 4D is located to allow the image light ray L1 to be incident on the in-coupling region 42D along a direction inclined to the thickness direction of the body 40. Also in this case, the light guide 4D reproduces the pupil L10 of the image right ray L1 to expand the pupil by: dividing the image light ray L1 entering the body 40 from the in-coupling region 42D into a plurality of the image light rays L2 in the plurality of branch directions; further dividing the plurality of image light rays L2 propagating in the plurality of branch directions into a plurality of mutually parallel image light rays L3; and allowing the plurality of image light rays L3 to emerge toward the field of view region 6.

Depending on an angle of the image light ray L1 incident on the in-coupling region 42D, an angle of propagation in the light guide 4D becomes larger. This may result in an increase in a region of the field of view region 6 where the pupil L10 of the image light ray L1 does not exist. In such cases, by appropriately setting the wave vectors k1, k2, k3, k4 of the periodic structure 41D can reduce the region of the field of view region 6 where the pupil L10 of the image light ray L1 does not exist.

Figure 15:
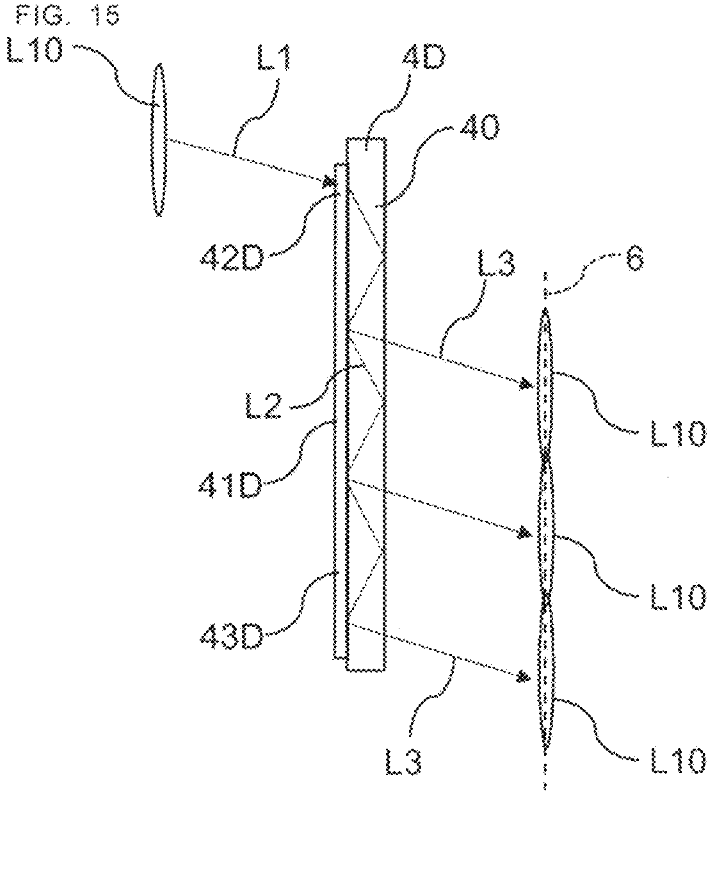
FIG. 15 is an explanatory view of another configuration example of the optical system of variation 4.
Figure 16:
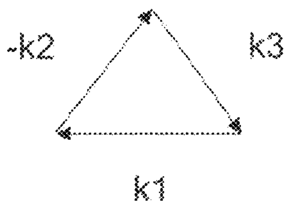
FIG. 16 is an explanatory view of an example of wave vectors of a periodic structure of a light guide of the optical system of FIG. 15.

FIG. 15 is a schematic view of another configuration example of the light guide 4D of variation 4. In FIG. 15, to show a function of pupil expansion of the image display device in an understandable manner, the pupil L10 is depicted instead of the display element 2 and the projection optical system 5. Also in FIG. 15, the light guide 4D is located to allow the image light ray L1 to be incident on the in-coupling region 42D along a direction inclined to the thickness direction of the body 40. In FIG. 15, the wave vectors k1, k2, k3, k4 of the periodic structure 41D are appropriately set to reduce the region of the field of view region 6 where the pupil L10 of the image light ray L1 does not exist. FIG. 16 is an explanatory view of an example of the wave vectors k1, k2, k3 of the periodic structure 41D of FIG. 15. In FIG. 16, the wave vectors k1, k2, k3 satisfy a relation of $|k1-k2+k3|=0$ and absolute values of two of the wave vectors k1, k2, k3 are identical to each other. In FIG. 16, the absolute values of the wave vectors k2, k3 are identical to each other. The wave vectors k1, k2, k3 constitutes an isosceles triangle. The absolute value of the wave vectors k1 is larger than the absolute values of the wave vectors k2, k3. For example, the angle between the wave vectors k1, k2 is 55 degrees, and the angle between the wave vectors k1, k3 is 125 degrees. In this case, the angle between the wave vectors k3, k4 is 55 degrees. In contrast, in the above embodiment, the absolute values of the wave vectors k1, k2, k3 are identical to each other and the angle between the wave vectors k1, k2 is 60 degrees and the angle between the wave vectors k1, k3 is 120 degrees. In this case, the angle between the wave vectors k3, k4 is 60 degrees. According to the wave vectors k1, k2, k3 of FIG. 16, in comparison with the above embodiment, an interval between the pupils L10 of the image light ray L1 can be narrowed in a direction perpendicular to the first branch direction D1 corresponding to a direction of the wave vectorsk1 within a plane perpendicular to the thickness direction of the body 40 (see FIG. 15).

In FIG. 16, the absolute values of the wave vectors k2, k3 are identical to each other, and the absolute value of the wave vectors k1 is larger than the absolute values of the wave vectors k2, k3. By doing so, even when the angle of the image light ray L1 incident on the in-coupling region 42D is set to increase the angle of propagation in the light guide 4D, it is possible to reduce the region of the field of view region 6 where the pupil L10 of the image light ray L1 does not exist. Further, the absolute value of the wave vectors k1 may be smaller than the absolute values of the wave vectors k2, k3. By doing so, even when the angle of the image light ray L1 incident on the in-coupling region 42D is set to decrease the angle of propagation in the light guide 4D, it is possible to appropriately adjust the interval between the pupils L10 of the image light ray L1 at the field of view region 6. Further, the absolute values of the wave vectors k2, k3 are not necessarily identical to each other. It is sufficient that absolute values of two of the wave vectors k1, k2, k3 are identical to each other.

Figure 17:
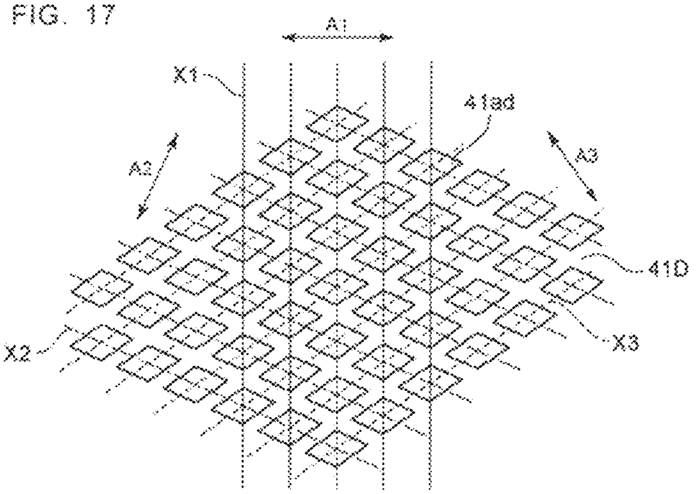
FIG. 17 is an explanatory view of another configuration example of the periodic structure of variation 4.

FIG. 17 is an explanatory view of a configuration example of the periodic structure 41D of another configuration example of the light guide 4D of variation 4. The periodic structure 41D of FIG. 17 includes a diffraction grating constituted by recessed or protruded parts 41*ad* in relation to the thickness direction of the body 40 which are arranged within the predetermined plane to have periodicity in the three predetermined directions A1, A2, A3. In FIG. 17, each recessed or protruded part 41*ad* is a protrusion with a quadrilateral shape (parallelogram shape in the FIGURES) in its plan view. The recessed or protruded parts 41*ad* of FIG. 17 satisfy the aforementioned condition (1) "in the predetermined direction A1, rows of the recessed or protruded parts 41*ad* arranged in a direction X1 perpendicular to the predetermined direction A1 are arranged at a regular interval", the condition (2) "in the predetermined direction A2, rows of the recessed or protruded parts 41*ad* arranged in a direction X2 perpendicular to the predetermined direction A2 are arranged at a regular interval", and the condition (3) "in the predetermined direction A3, rows of the recessed or protruded parts 41*ad* arranged in a direction X3 perpendicular to the predetermined direction A3 are arranged at a regular interval".

Figure 18:
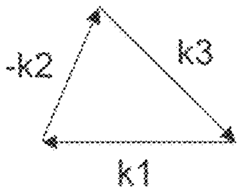
FIG. 18 is an explanatory view of an example of wave vectors of the periodic structure of FIG. 17.

FIG. 18 is an explanatory view of an example of the wave vectors k1, k2, k3 of the periodic structure 41D of FIG. 17. In FIG. 18, the wave vectors k1, k2, k3 satisfy a relation of $|k1-k2+k3|=0$ but the absolute values of the wave vectors k1, k2, k3 are different from each other. For example, the absolute value of the wave vector k3 is larger than the absolute values of the wave vectors k1, k2 and the absolute value of the wave vector k1 is larger than the absolute value of the wave vector k2. For example, the angle between the wave vectors k1, k2 is 65 degrees, and the angle between the wave vectors k1, k3 is 125 degrees. In this case, the angle between the wave vectors k3, k4 is 55 degrees. According to the wave vectors k1, k2, k3 of FIG. 18, even when the image light ray L1 is incident in an arbitrary direction inclined to the thickness direction of the light guide 4D, it is possible to appropriately adjust the interval between the pupils L10 of the image light ray L1 at the field of view region 6. By appropriately setting the relation between the absolute values of the wave vectors k1, k2, k3 in consideration of arrangement of the pupils L10 of the image light ray L1 at the field of view region 6 as described above, the interval between the pupils L10 of the image light ray L1 at the field of view region 6 can be adjusted appropriately.

As described above, in the light guide 4D, two of the absolute values of the wave vectors k1, k2, and k3 may be identical to each other. This configuration enables adjusting locations of the pupils L10 of the image light ray L1 in the field of view region 6. Further, in the light guide 4D, the absolute values of the wave vectors k1, k2, and k3 may be different from each other. This configuration also enables adjusting locations of the pupils L10 of the image light ray L1 in the field of view region 6.

2.5 Variation 5

Figure 19:
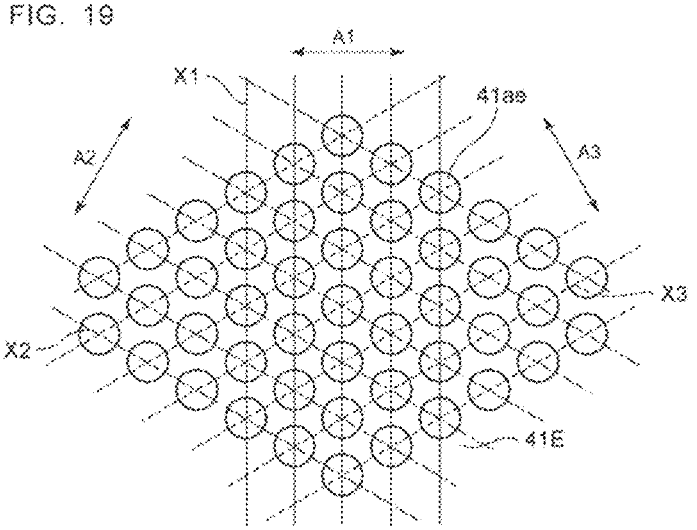
FIG. 19 is an explanatory view of a configuration example of a periodic structure of a light guide of variation 5.

FIG. 19 is an explanatory view of a configuration example of a periodic structure 41E of alight guide 4E of variation 5. The periodic structure 41E of FIG. 19 includes a diffraction grating constituted by recessed or protruded parts 41*ae* in relation to the thickness direction of the body 40 arranged within the predetermined plane to have periodicity in the three predetermined directions A1, A2, A3. In FIG. 19, each recessed or protruded part 41*ae* is a protrusion with a true circle shape in its plan view. The recessed or protruded parts 41*ae* of FIG. 19 satisfy the aforementioned condition (1) "in the predetermined direction A1, rows of the recessed or protruded parts 41*ae* arranged in a direction X1 perpendicular to the predetermined direction A1 are arranged at a regular interval", the condition (2) "in the predetermined direction A2, rows of the recessed or protruded parts 41*ae* arranged in a direction X2 perpendicular to the predetermined direction A2 are arranged at a regular interval", and the condition (3) "in the predetermined direction A3, rows of the recessed or protruded parts 41*ae* arranged in a direction X3 perpendicular to the predetermined direction A3 are arranged at a regular interval".

Figure 20:
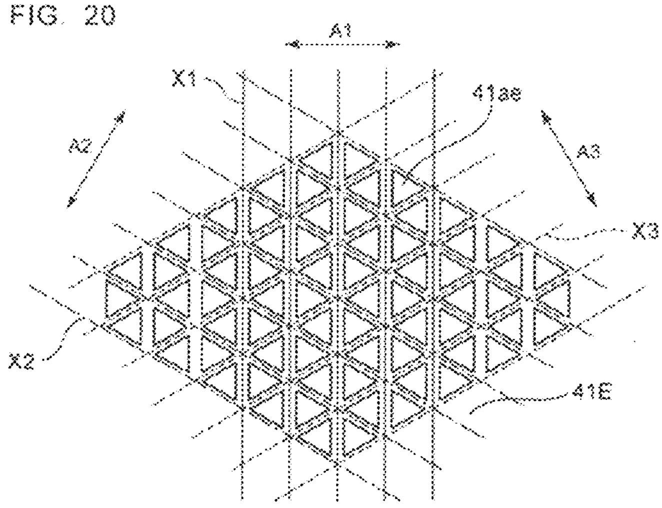
FIG. 20 is an explanatory view of another configuration example of a periodic structure of the light guide of variation 5.

FIG. 20 is an explanatory view of another configuration example of the periodic structure 41E of the light guide 4E of variation 5. The periodic structure 41E of FIG. 20 includes a diffraction grating constituted by the recessed or protruded parts 41*ae* in relation to the thickness direction of the body 40 arranged within the predetermined plane to have periodicity in the three predetermined directions A1, A2, A3. In FIG. 20, each recessed or protruded part 41*ae* is a protrusion with a triangle shape (regular triangle shape in FIGURES) in its plan view. The recessed or protruded parts 41*ae* of FIG. 20 satisfy the aforementioned conditions (1) to (3).

Figure 21:
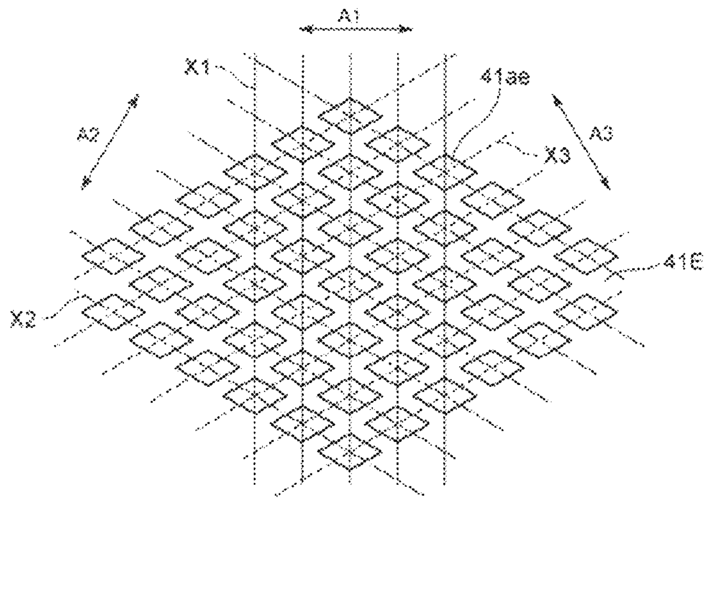
FIG. 21 is an explanatory view of another configuration example of a periodic structure of the light guide of variation 5.

FIG. 21 is an explanatory view of another configuration example of the periodic structure 41E of the light guide 4E of variation 5. The periodic structure 41E of FIG. 21 includes a diffraction grating constituted by the recessed or protruded parts 41*ae* in relation to the thickness direction of the body 40 arranged within the predetermined plane to have periodicity in the three predetermined directions A1, A2, A3. In FIG. 21, each recessed or protruded part 41*ae* is a protrusion with a quadrilateral shape (parallelogram shape in the figure) in its plan view. The recessed or protruded parts 41*ae* of FIG. 21 satisfy the aforementioned conditions (1) to (3).

As described above, when the recessed or protruded parts 41*ae* of the periodic structure 41E satisfy the aforementioned conditions (1) to (3), the shapes of the recessed or protruded parts 41*ae* are not limited in particular. The recessed or protruded part 41*ae* may be a protrusion (protruded part) protruding in the thickness direction of the body 40, or a recessed part recessed in the thickness direction of the body 40. The recessed or protruded part 41*ae* have circular, polygonal, or other shapes in its plan view. If the recessed or protruded parts 41*ae* can constitute the periodic structure 41E, they may be any of a group of protrusions (protruded parts), a group of recessed parts, or a combination of protruded parts and recessed parts. Further, when the aforementioned conditions (1) to (3) are satisfied, the intervals between the recessed or protruded parts 41*ae* in the predetermined direction A1, the predetermined direction A2, and the predetermined direction A3 may be different from each other. These points may similarly apply to the recessed or protruded parts 41*a* of the aforementioned embodiment and the recessed or protruded parts 41*aa* of variation 1.

2.6 Variation 6

Figure 22:
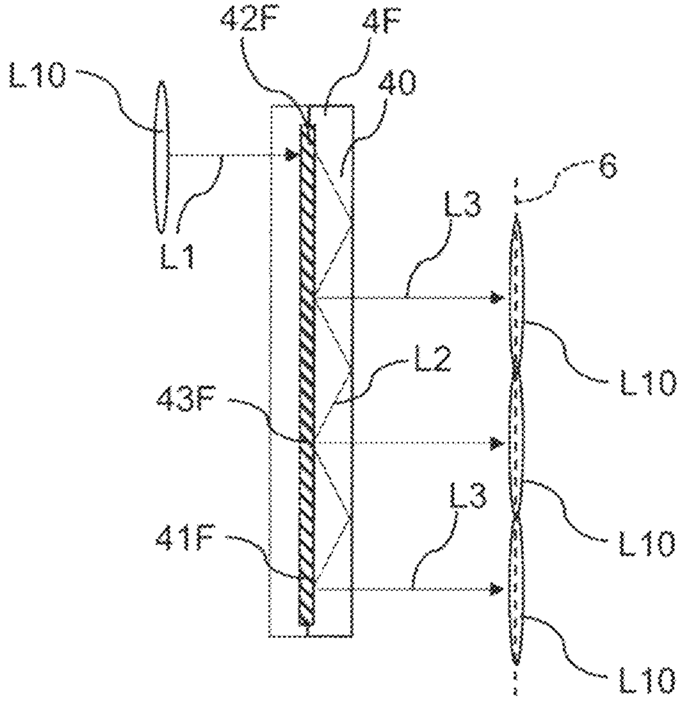
FIG. 22 is an explanatory view of a configuration example of a periodic structure of a light guide of variation 6.

FIG. 22 is an explanatory view of a configuration example of a periodic structure 41F of a light guide 4F of variation 6. In FIG. 22, to show a function of pupil expansion of the image display device in an understandable manner, the pupil L10 is depicted instead of the display element 2 and the projection optical system 5. The periodic structure 41F of FIG. 22 includes a volume holographic element (holographic diffraction grating) causing diffraction effect by periodic modulation of refractive indices. In detail, the periodic structure 41F includes a volume holographic element subject to multiple exposure to have periodicity in the three predetermined directions A1, A2, A3. In FIG. 22, the periodic structure 41F is formed inside the body 40. The periodic structure 41F includes a diffraction grating having a structure where portions having different refractive indices are arranged alternately. The periodic structure 41F of FIG. 22 includes an in-coupling region 42F and an exit region 43F. The in-coupling region 42F is a region on which the image light ray L1 from the display element 2 is incident, in the periodic structure 41F. The exit region 43F is a region which allows image light rays L3 to emerge toward the field of view region 6, in the periodic structure 41F and is a region other than the in-coupling region 42F, in the periodic structure 41F.

The light guide 4F of FIG. 22 also reproduces the pupil L10 of the image right ray L1 to expand the pupil L10 by: dividing the image light ray L1 entering the body 40 from the in-coupling region 42F within the body 40 into the plurality of image light rays L2 propagating in the plurality of branch direction; and further dividing the plurality of image light rays L2 propagating in the plurality of branch directions into the plurality of mutually parallel image light rays L3 to allow them to emerge toward the field of view region 6.

As described above, the periodic structure 41F includes the volume holographic element subject to multiple exposure to have periodicity in the three predetermined directions A1, A2, A3. This configuration enables downsizing the light guide 4F.

2.7 Other Variations

In one variation, the projection optical system 5 may be constituted by a plurality of optical elements. The plurality of optical elements may include a first compound lens where a negative meniscus lens and biconvex lens are combined, and a second compound lens where a positive meniscus lens and a negative meniscus lens are combined. The projection optical system 5 may not be limited if it can allow the image light ray L1 from the display element 2 to be incident on the light guide 4 with desired optical properties. Further, depending on cases, the projection optical system 5 may be omitted.

In the above embodiment, the projection optical system 5 and the in-coupling region 42 of the light guide 4 are arranged in a straight line. However, it is not always necessary that the projection optical system 5 and the in-coupling region 42 of the light guide 4 are arranged in a straight line. In other words, the optical path of the image light ray L1 from the projection optical system 5 to the in-coupling region 42 of the light guide 4 always need not be straight. For example, the image light ray L1 from the projection optical system 5 may be reflected by a reflective plate to be incident on the in-coupling region 42 of the light guide 4. In this arrangement, the optical path of the image light ray L1 from the projection optical system 5 to the in-coupling region 42 of the light guide 4 is not straight but an L-shape, for example.

In one variation, the periodic structure may be configured to include a diffraction grating constituted by the recessed or protruded parts 41*a* arranged within the predetermined plane perpendicular to the thickness direction of the body 40 to have periodicity in the three predetermined directions A1, A2, A3, and a volume holographic element subject to multiple exposure to have periodicity in the three predetermined directions A1, A2, A3.

In the aforementioned embodiment, the plurality of branch directions includes the first to third branch directions D1 to D3 and additionally the fourth branch direction D4. In variation 2, the plurality of branch directions includes the first to third branch directions D1 to D3 and additionally the fourth to sixth branch directions D4 to D6. Not limited thereto, in one variation, the plurality of branch directions may include the first to third branch directions D1 to D3 and further include either one of the fifth branch direction D5 or the sixth branch direction D6 or any two of the fourth to sixth branch directions D4 to D6. In brief, the plurality of branch directions may further include at least one of the fourth, fifth, and sixth branch directions D4, D5, D6. When the wave vector in the fourth branch direction D4, of the periodic structure 41 is denoted by k4, k4=−k1. When the wave vector in the fifth branch direction D5, of the periodic structure 41 is denoted by k5, k5=−k2. When the wave vector in the sixth branch direction D6, of the periodic structure 41 is denoted by k6, k6=−k3. This configuration enables expanding the field of view region 6.

In relation to variation 1, not each of the plurality of exit parts 44 but a predetermined exit part 44 of the plurality of exit parts 44 has the branch diffraction efficiency larger than the exit diffraction efficiency, the exit diffraction efficiency being an efficiency of diffracting the image light ray L2 propagating in the adjacent direction in which the in-coupling region 42 and the predetermined exit part 44 are adjacent to each other, into a direction toward the field of view region 6, and the branch diffraction efficiency being an efficiency of diffracting the image light ray L2 propagating in the adjacent direction into a predetermined branch direction different from the adjacent direction.

In relation to the embodiment, the exit region 43 may include a part having a diffraction efficiency from the light guide 4 toward the field of view region 6, which becomes greater as further from the in-coupling region 42. In relation to variation 1, at least one of the plurality of exit parts 44-1 to 44-4 may have a diffraction efficiency from the light guide 4 toward the field of view region 6, which becomes greater as further from the in-coupling region 42. This configuration enables improvement of uniformity of light intensity distribution at the field of view region 6. Since the intensity of the image light rays L2 becomes larger as closer to the in-coupling region 42, the diffraction efficiency from the light guide 4 toward the field of view region 6 is made greater as further from the in-coupling region 42 to decrease light intensity at a location closer to the in-coupling region 42 and increase light intensity at a location further from the in-coupling region 42. By doing so, it is possible to uniform light intensity distribution at the field of view region 6. Examples of how to adjust the diffraction efficiency into a direction toward the field of view region 6 may include adjustment of heights of the recessed or protruded parts 41*a*.

In the above embodiment, the three predetermined directions A1, A2, A3 are, not limited thereto, directions not perpendicular to each other but intersecting each other in the predetermined plane perpendicular to the thickness direction of the body 40. For example, at least two of the three predetermined directions A1, A2, A3 may be perpendicular to each other. The three predetermined directions A1, A2, A3 may be selected appropriately depending on usage of the optical system 3 or the like.

3. Aspects

As apparent from the above embodiment and variations, the present disclosure includes the following aspects. Hereinafter, reference signs in parenthesis are attached for the purpose of clearly showing correspondence with the embodiments only.

The first aspect is an optical system (3) including a light guide (4; 4A; 4B; 4C; 4D; 4E; 4F) for guiding an image light ray (L1) which is output from a display element (2) and forms an image, to a field of view region (6) of a user as a virtual image. The light guide (4; 4A; 4B; 4C; 4D; 4E; 4F) includes a body (40; 40C) having a plate shape and a periodic structure (41; 41A; 41B; 41C; 41D; 41E; 41F) formed in the body (40; 40C). The periodic structure (41; 41A; 41B; 41C; 41D; 41E; 41F) has periodicity in three predetermined directions (A1, A2, A3) intersecting each other within a predetermined plane perpendicular to a thickness direction of the body (40; 40C). The periodic structure (41; 41A; 41B; 41C; 41D; 41E; 41F) includes an in-coupling region (42; 42B; 42C; 42D; 42F) dividing the image light ray (L1) incident from the display element (2) into a plurality of the image light rays and allowing the plurality of image light rays to propagate within the body (40; 40C) in a plurality of branch directions including first, second, and third branch directions (D1, D2, D3) respectively parallel to the three predetermined directions (A1, A2, A3). This aspect enables downsizing the light guide (4; 4A; 4B; 4C; 4D; 4E; 4F).

The second aspect is the optical system (3) based on the first aspect. In the second aspect, the periodic structure (41; 41A; 41B; 41C; 41D; 41E; 41F) further includes an exit region (43; 43A; 43B; 43C; 43F) allowing the plurality of image light rays (L2) propagating in the plurality of branch directions within the body (40; 40C) to emerge from the body (40; 40C) toward the field of view region (6). This aspect enables downsizing the light guide (4; 4A; 4B; 4C; 4D; 4E; 4F).

The third aspect is the optical system (3) based on the second aspect. In the third aspect, the periodic structure (41; 41A; 41B; 41C; 41D; 41E; 41F) includes a diffraction grating constituted by recessed or protruded parts (41*a*; 41*aa*; 41*ad*; 41*ae*) in relation to the thickness direction of the body (40; 40C) which are arranged within the predetermined plane to have periodicity in the three predetermined directions (A1, A2, A3). This aspect enables simplification of the light guide (4; 4A; 4B; 4C; 4D; 4E; 4F).

The fourth aspect is the optical system (3) based on the third aspect. In the fourth aspect, the recessed or protruded parts (41*a*; 41*aa*; 41*ad*) are arranged within the predetermined plane in a hexagonal lattice. This aspect enables downsizing the light guide (4; 4A; 4B; 4C; 4D).

The fifth aspect is the optical system (3) based on any one of the second to fourth aspects. In the fifth aspect, the periodic structure (41F) includes a volume holographic element subject to multiple exposure to have periodicity in the three predetermined directions (A1, A2, A3). This aspect enables downsizing the light guide (4F).

The sixth aspect is the optical system (3) based on any one of the second to fifth aspects. In the sixth aspect, the in-coupling region (42; 42B; 42C; 42D; 42F) and the exit region (43; 43A; 43B; 43C; 43F) have the same periods in the three predetermined directions (A1, A2, A3), individually. This enables simplification of the structure of the light guide (4; 4A; 4B; 4C; 4D; 4E; 4F).

The seventh aspect is the optical system (3) based on any one of the second to sixth aspects. In the seventh aspect, the in-coupling region (42) and the exit region (43A) have different diffraction efficiencies in at least one of the plurality of branch directions. This aspect enable adjusting light intensity distribution at the field of view region (6).

The eighth aspect is the optical system (3) based on any one of the second to seventh aspects. In the eighth aspect, the exit region (43) includes a part having a diffraction efficiency from the light guide (4) toward the field of view region (6), which becomes greater as further from the in-coupling region (42). This aspect enable improvement of uniformity of light intensity distribution at the field of view region (6).

The ninth aspect is the optical system (3) based on any one of the second to eighth aspects. In the ninth aspect, the exit region (43A) includes a plurality of exit parts (44-1 to 44-4) adjacent to the in-coupling region (42) in the plurality of branch directions individually. At least two of the plurality of exit parts (44-1 to 44-4) have different diffraction efficiencies for incident light under a same condition. This aspect enable adjusting light intensity distribution at the field of view region (6).

The tenth aspect is the optical system (3) based on the ninth aspect. In the tenth aspect, at least two of the plurality of exit parts (44-1 to 44-4) are different in a direction of elements constituting the periodic structure (41B) but have a same periodicity. This aspect enable improvement of uniformity of light intensity distribution at the field of view region (6).

The eleventh aspect is the optical system (3) based on the ninth or tenth aspect. In the eleventh aspect, a predetermined exit part of the plurality of exit parts (44-1 to 44-4) includes a region which has a branch diffraction efficiency larger than an exit diffraction efficiency. The exit diffraction efficiency is an efficiency of diffracting the image light ray (L2) propagating in an adjacent direction in which the in-coupling region (42) and the predetermined exit part are adjacent to each other, into a direction toward the field of view region (6). The branch diffraction efficiency is an efficiency of diffracting the image light ray (L2) propagating in the adjacent direction into a predetermined branch direction different from the adjacent direction. This aspect enable improvement of uniformity of light intensity distribution at the field of view region (6).

The twelfth aspect is the optical system (3) based on any one of the ninth to eleventh aspects. In the twelfth aspect, at least one of the plurality of exit parts (44) includes recessed or protruded parts (41*aa*) arranged to have periodicity in the three predetermined directions (A1, A2, A3) within the predetermined plane. A ratio of a size of the recessed or protruded parts (41*aa*) relative to a period of arrangement of the recessed or protruded parts (41*aa*) is larger in a direction perpendicular to a branch direction different from a branch direction of the plurality of branch direction (D1, D2, D3, D4), in which a corresponding exit part is adjacent to the in-coupling region (42), than in a direction perpendicular to a branch direction of the plurality of the branch direction (D1, D2, D3, D4), in which the corresponding exit part is adjacent to the in-coupling region (42). This aspect enables improvement of uniformity of light intensity distribution at the field of view region (6) with a simplified structure. Particularly, in relation to the tenth aspect, the predetermined exit part includes recessed or protruded parts (41*aa*) arranged within the predetermined plane to have periodicity in the three predetermined directions (A1, A2, A3). A ratio of a size of the recessed or protruded parts (41*aa*) relative to a period of arrangement of the recessed or protruded parts (41*aa*) is larger in a direction perpendicular to the predetermined branch direction within the predetermined plane than in a direction perpendicular to the adjacent direction within the predetermined plane.

The thirteenth aspect is the optical system (3) based on any one of the second to twelfth aspects. In the thirteenth aspect, when wave vectors in the first, second, and third branch directions (D1, D2, D3) of the periodic structure (41; 41A; 41B; 41C; 41D; 41E; 41F) are denoted by k1, k2, and k3, respectively, and a maximum value of absolute values of the wave vectors in the first, second, and third branch directions (D1, D2, D3) is denoted by km, the wave vectors k1, k2, and k3 satisfy a relation of $|k1-k2+k3|<km/5$. This configuration enables improvement of image quality. Preferably, the wave vectors k1, k2, and k3 satisfy a relation of $|k1-k2+k3|<km/10$. This configuration enables improvement of image quality. More preferably, the wave vectors k1, k2, and k3 satisfy a relation of $|k1-k2+k3|<km/50$. This configuration enables improvement of image quality.

The fourteenth aspect is the optical system (3) based on the thirteenth aspect. In the fourteenth aspect, the wave vectors k1, k2, and k3 satisfy a relation of $|k1-k2+k3|=0$. This configuration enables improvement of image quality.

The fifteenth aspect is the optical system (3) based on the thirteenth or fourteenth aspect. In the fifteenth aspect, the absolute values of the wave vectors k1, k2, and k3 are identical to each other. This aspect enables arranging the pupils (L10) of the image light ray (L1) at a regular interval in the field of view region (6).

The sixteenth aspect is the optical system (3) based on the thirteenth or fourteenth aspect. In the sixteenth aspect, two of the absolute values of the wave vectors k1, k2, and k3 are identical to each other. This aspect enables adjusting locations of the pupils (L10) of the image light ray (L1) in the field of view region (6).

The seventeenth aspect is the optical system (3) based on the thirteenth or fourteenth aspect. In the seventeenth aspect, the absolute values of the wave vectors k1, k2, and k3 are different from each other. This aspect enables adjusting locations of the pupils (L10) of the image light ray (L1) in the field of view region (6).

The eighteenth aspect is the optical system (3) based on any one of the second to seventeenth aspects. In the seventeenth aspect, the light guide (4; 4A; 4B; 4C; 4D; 4E; 4F) reproduces a pupil (L10) of the image right ray (L1) to expand the pupil (L10) by: converting the image light ray (L1) entering the light guide (4; 4A; 4B; 4C; 4D; 4E; 4F) from the in-coupling region (42; 42B; 42C; 42D; 42F) into a plurality of image light rays (L2) in the plurality of branch directions allowed to propagate in the plurality of branch directions within the body (40; 40C); and dividing the plurality of image light rays into a plurality of mutually parallel image light rays (L3) in each of the plurality of branch directions to be allowed to emerge toward the field of view region (6). This aspect enables downsizing the light guide (4; 4A; 48; 4C; 4D; 4E; 4F).

The nineteenth aspect is the optical system (3) based on any one of the second to eighteenth aspects. In the nineteenth aspect, the in-coupling region (42; 42B; 42C; 42D; 42F) is arranged side by side with the exit region (43; 43A; 43B; 43C; 43F) in each of the three predetermined directions (A1, A2, A3). This aspect can improve transfer efficiency from the in-coupling region (42; 42B; 42C; 42D; 42F) to the exit region (43; 43A; 43B; 43C; 43F).

The twentieth aspect is the optical system (3) based on any one of the second to nineteenth aspect. In the twentieth aspect, the periodic structure (41; 41A; 41C; 41D; 41E; 41F) is formed not to include a region separating the in-coupling region (42; 42C; 42D; 42F) and the exit region (43; 43A; 43C; 43F) between the in-coupling region (42; 42C; 42D; 42F) and the exit region (43; 43A; 43C; 43F). This aspect enables simplification of the structure of the periodic structure (41; 41A; 41C; 41D; 41E; 41F).

The twenty-first aspect is the optical system (3) based on any one of the second to twentieth aspects. In the twenty-first aspect, the plurality of branch directions further include at least one of fourth, filth, and sixth branch directions (D4, D5, D6). When a wave vector in the fourth branch direction (D4) of the periodic structure (41; 41A; 41B; 41C; 41D; 41E; 41F) is denoted by k4, k4 is equal to −k1. When a wave vector in the fifth branch direction (D5) of the periodic structure (41; 41A; 41B; 41C; 41D; 41E; 41F) is denoted by k5, k5 is equal to −k2. When a wave vector in the sixth branch direction (D6) of the periodic structure (41; 41A; 41B; 41C; 41D; 41E; 41F) is denoted by k6, k6 is equal to −k3. This aspect enables expansion of the field of view region (6).

The twenty-second aspect is the optical system (3) based on any one of the first to twenty-first aspects. In the twenty-second aspect, the optical system (3) further includes a projection optical system (5) allowing the image light ray (L1) to be incident on the in-coupling region (42; 42B; 42C; 42D; 42F) of the light guide (4; 4A; 4B; 4C; 4D; 4E; 4F) as a substantial collimate light ray. This aspect enables improvement of the use efficiency of the image light ray (L1).

The twenty-third aspect is an image display device (1) including: the optical system (3) according to any one of the first to twenty-second aspects; and the display element (2). This aspect enables downsizing the light guide (4).

As above, as examples of techniques in the present disclosure, the embodiments are described. For this purpose, the attached drawings and the description are provided. Therefore, components described in the attached drawings and the description may include not only components necessary for solving problems but also components which are unnecessary for solving problems but useful for exemplifying the above techniques. Note that, such unnecessary components should not be considered as necessary just for the reason why such unnecessary components are described in the attached drawings and the description. Further, the embodiment described above is just prepared for exemplifying the techniques in the present disclosure and thus may be subjected to various modification, replacement, addition, omission, or the like within the scope defined by claims and those equivalent range.

INDUSTRIAL APPLICABILITY

The present disclosure is applicable to optical systems and image display devices. In more detail, the present disclosure is applicable to an optical system for guiding light from a display element to a field of view region of a user, and an image display device including this optical system.

REFERENCE SIGNS LIST

1 Image Display Device
2 Display Element
3 Optical System
4, 4A, 4B, 4C, 4D, 4E, 4F Light Guide
40, 40C Body
41, 41A, 41B, 41C, 41D, 41E, 41F Periodic Structure
41*a*, 41*aa*, 41*ad*, 41*ae* Recessed or Protruded Part
42, 42B, 42C, 42D, 42F In-coupling Region
43, 43A, 43B, 43C, 43F Exit Region
44-1, 44-2, 44-3, 44-4 Exit Part
45 Intermediate Region
5 Projection Optical System
6 Field of View Region
A1, A2, A3 Predetermined Direction
D1 First Divided Direction (Divided Direction)
D2 Second Divided Direction (Divided Direction)
D3 Third Divided Direction (Divided Direction)
D4 Fourth Divided Direction (Divided Direction)
D5 Fifth Divided Direction (Divided Direction)
D6 Sixth Divided Direction (Divided Direction)
L1, L2, L3 Image Light Ray
L10 Pupil

The invention claimed is:

1. An optical system comprising:

a light guide for guiding an image light ray which is output from a display element and forms an image, to a field of view region of a user as a virtual image, wherein:

the light guide includes a body having a plate shape and a periodic structure defined in the body;

the periodic structure has periodicity in three predetermined directions intersecting each other within a predetermined plane perpendicular to a thickness direction of the body;

the periodic structure includes an in-coupling region and an exit region;

the in-coupling region is configured to: (i) divide the image light ray incident from the display element into a plurality of image light rays; and (ii) allow the plurality of image light rays to propagate within the body in a plurality of branch directions including first, second, and third branch directions parallel to the three predetermined directions, respectively;

the exit region is configured to allow the plurality of image light rays propagating in the plurality of branch directions within the body to emerge from the body toward the field of view region;

the exit region includes a plurality of exit parts adjacent to the in-coupling region in the plurality of branch directions individually;

at least two of the plurality of exit parts have different diffraction efficiencies for incident light under a same condition;

a predetermined exit part of the plurality of exit parts includes a region which has a branch diffraction efficiency larger than an exit diffraction efficiency;

the exit diffraction efficiency is an efficiency of diffracting the image light ray propagating in an adjacent direction in which the in-coupling region and the predetermined exit part are adjacent to each other, into a direction toward the field of view region; and the branch diffraction efficiency is an efficiency of diffracting the image light ray propagating in the adjacent direction into a predetermined branch direction different from the adjacent direction.

2. The optical system according to claim 1, wherein the periodic structure includes a diffraction grating constituted by recessed or protruded parts in relation to the thickness direction of the body which are arranged within the predetermined plane to have periodicity in the three predetermined directions.

3. The optical system according to claim 2, wherein the recessed or protruded parts are arranged within the predetermined plane in a hexagonal lattice.

4. The optical system according to claim 1, wherein the periodic structure includes a volume holographic element subject to multiple exposure to have periodicity in the three predetermined directions.

5. The optical system according to claim 1, wherein the in-coupling region and the exit region have a same period in each of the three predetermined directions.

6. The optical system according to claim 1, wherein the in-coupling region and the exit region have different diffraction efficiencies in at least one of the plurality of branch directions.

7. The optical system according to claim 1, wherein the exit region includes a part having a diffraction efficiency from the light guide toward the field of view region, which becomes greater further from the in-coupling region.

8. The optical system according to claim 7, wherein at least two of the plurality of exit parts are different in a direction of elements constituting the periodic structure but have a same periodicity.

9. An optical system comprising:

a light guide for guiding an image light ray which is output from a display element and forms an image, to a field of view region of a user as a virtual image, wherein:

the light guide includes a body having a plate shape and a periodic structure defined in the body;

the periodic structure has periodicity in three predetermined directions intersecting each other within a predetermined plane perpendicular to a thickness direction of the body;

the periodic structure includes an in-coupling region and an exit region;

the in-coupling region is configured to: (i) divide the image light ray incident from the display element into a plurality of image light rays; and (ii) allow the plurality of image light rays to propagate within the body in a plurality of branch directions including first, second, and third branch directions parallel to the three predetermined directions, respectively;

the exit region is configured to allow the plurality of image light rays propagating in the plurality of branch directions within the body to emerge from the body toward the field of view region;

the exit region includes a plurality of exit parts adjacent to the in-coupling region in the plurality of branch directions individually;

at least two of the plurality of exit parts have different diffraction efficiencies for incident light under a same condition;

at least one of the plurality of exit parts includes recessed or protruded parts arranged to have periodicity in the three predetermined directions within the predetermined plane; and a ratio of a size of the recessed or protruded parts relative to a period of arrangement of the recessed or protruded parts is larger in a direction perpendicular to a branch direction different from a branch direction of the plurality of branch directions, in which a corresponding exit part is adjacent to the in-coupling region, than in a direction perpendicular to a branch direction of the plurality of the branch directions, in which the corresponding exit part is adjacent to the in-coupling region.

10. The optical system according to claim 1, wherein:

wave vectors in the first, second, and third branch directions are denoted by k1, k2, and k3, respectively;

a maximum value of absolute values |k1|, |k2|, |k3| of the wave vectors in the first, second, and third branch directions is denoted by |km|; and the wave vectors k1, k2, and k3 satisfy a relation of $|k1-k2+k3|<|km|/5$.

11. The optical system according to claim 10, wherein the wave vectors k1, k2, and k3 satisfy a relation of $|k1-k2+k3|=0$.

12. The optical system according to claim 1, wherein the light guide is configured to reproduce a pupil of the image light ray to expand the pupil by: converting the image light ray entering the light guide from the in-coupling region into the plurality of image light rays allowed to propagate in the plurality of branch directions within the body; and dividing the plurality of image light rays into a plurality of mutually parallel image light rays in each of the plurality of branch directions to be allowed to emerge toward the field of view region.

13. The optical system according to claim 1, wherein the in-coupling region is arranged side by side with the exit region in each of the three predetermined directions.

14. The optical system according to claim 1, further comprising:

a projection optical system configured to allow the image light ray to be incident on the in-coupling region of the light guide as a substantial collimate light ray.

15. An image display device comprising:

the optical system according to claim 1; and the display element.

* * * * *